United States Patent
Mukunashi

(10) Patent No.: US 10,091,432 B2
(45) Date of Patent: Oct. 2, 2018

(54) IMAGE CAPTURING APPARATUS, CONTROL METHOD THEREOF AND STORAGE MEDIUM STORING CONTROL PROGRAM THEREFOR

(71) Applicant: CANON KABUSHIKI KAISHA, Tokyo (JP)

(72) Inventor: Masayuki Mukunashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/056,779

(22) Filed: Feb. 29, 2016

(65) Prior Publication Data
US 2016/0261784 A1  Sep. 8, 2016

(30) Foreign Application Priority Data

Mar. 3, 2015 (JP) .................. 2015-041436
Dec. 22, 2015 (JP) .................. 2015-250675

(51) Int. Cl.
*H04N 5/228* (2006.01)
*H04N 5/235* (2006.01)
*H04N 5/232* (2006.01)

(52) U.S. Cl.
CPC ....... *H04N 5/2353* (2013.01); *H04N 5/23254* (2013.01); *H04N 5/23258* (2013.01); *H04N 5/23287* (2013.01)

(58) Field of Classification Search
CPC ........... H04N 5/23248; H04N 5/23251; H04N 5/23258; H04N 5/23261
USPC .............................. 348/208.99, 208.4–208.7
See application file for complete search history.

(56) References Cited

U.S. PATENT DOCUMENTS

| 6,344,876 B2 | 2/2002 | Shiomi | |
| 7,546,026 B2* | 6/2009 | Pertsel | H04N 5/23248 348/208.14 |
| 2008/0094498 A1* | 4/2008 | Mori | G03B 5/02 348/352 |

(Continued)

FOREIGN PATENT DOCUMENTS

| JP | 04-163535 A | 6/1992 |
| JP | 07-098471 A | 4/1995 |

(Continued)

OTHER PUBLICATIONS

The above patent documents were cited in a British Search Report issued on Sep. 6, 2016, that issued in the corresponding U.K. Patent Application No. 1603693.1.

(Continued)

*Primary Examiner* — Kelly L Jerabek
(74) *Attorney, Agent, or Firm* — Cowan, Liebowitz & Latman, P.C.

(57) ABSTRACT

In the image capturing apparatus, the controller controls an optical element, when a motion of the image capturing apparatus follows a motion of the object, by using first motion information obtained from a first detector to detect the motion of the image capturing apparatus and second motion information obtained from a second detector to detect the motion of the object. The calculator calculates prediction information on the motion of the object during an exposure time, by using the second information detected at multiple times before the exposure time. The controller uses the prediction information to control the optical element during the exposure time.

37 Claims, 20 Drawing Sheets

(56) References Cited

U.S. PATENT DOCUMENTS

| | | |
|---|---|---|
| 2009/0135270 A1 | 5/2009 | Makino et al. |
| 2010/0265353 A1 | 10/2010 | Koyama et al. |
| 2011/0317044 A1 | 12/2011 | Ishii et al. |
| 2012/0081558 A1* | 4/2012 | Ogura ................ H04N 5/23267 348/208.6 |
| 2014/0267803 A1* | 9/2014 | Shintani ............ H04N 5/23293 348/208.2 |

FOREIGN PATENT DOCUMENTS

| | | |
|---|---|---|
| JP | 2008-136174 A | 6/2008 |
| KR | 10-2008-0059462 A | 6/2008 |

OTHER PUBLICATIONS

The above foreign patent documents were cited in the Jul. 16, 2018 Korean Office Action, which is enclosed without an English Translation, that issued in Korean Patent Application No. 10-2016-0021083.

* cited by examiner

IMAGE CAPTURING APPARATUS, CONTROL METHOD THEREOF AND STORAGE MEDIUM STORING CONTROL PROGRAM THEREFOR

FIELD OF THE INVENTION

The present invention relates to a technique of reducing image blur in a so-called "follow shot".

DESCRIPTION OF THE RELATED ART

The follow shot, which enables expressing a sense of speed of a moving object, is a technique of photography to acquire a captured image in which the object is still and a background flows, by panning an image capturing apparatus (camera) so as to follow the motion of the object. In such follow shot, a faster or slower panning speed than a motion velocity of the object generates a captured image including a blurred object image.

Japanese Patent Laid-Open No. 04-163535 discloses a camera that corrects such object image blur by moving part of an optical system or an image sensor during image capturing (exposure) on a basis of an angular velocity of the object relative to the camera calculated before the image capturing and an angular velocity of the camera during the image capturing obtained from an angular velocity sensor. This camera calculates the angular velocity relative to the camera (hereinafter referred to as "a relative object angular velocity") by using an output from the angular velocity sensor and a displacement amount of the object image on an image plane; the displacement amount is detected from temporally sequential captured images.

The camera disclosed in Japanese Patent Laid-Open No. 04-163535 premises that the relative object angular velocity is uniformly maintained during the image capturing in which the image blur is corrected. However, even if the moving object (for example, a train) is in uniform linear motion, the relative object angular velocity measured from the camera located in a direction orthogonal to a motion direction of the object changes (increases or decreases). In this case, when a measurement time of the relative object angular velocity and a time of actual image capturing have a time lag, disregarding the change of the relative object angular velocity during the time lag makes it impossible to adequately correct the image blur during the image capturing.

BRIEF SUMMARY OF THE INVENTION

The present invention provides an image capturing apparatus capable of performing a good follow shot with reduced object image blur even when an object velocity detected from a camera changes.

The present invention provides as an image capturing apparatus configured to perform image capturing of an object. The apparatus includes a controller configured to control an optical element, when a motion of the image capturing apparatus follows a motion of the object, by using first motion information obtained from a first detector to detect the motion of the image capturing apparatus and second motion information obtained from a second detector to detect the motion of the object. The calculator configured to calculate prediction information on the motion of the object during an exposure time, by using the second information detected at multiple times before the exposure time. The controller is configured to use the prediction information to control the optical element during the exposure time.

The present invention provides as another aspect thereof an image capturing apparatus configured to perform image capturing of an object. The apparatus includes a controller configured to control an optical element, when a motion of the image capturing apparatus follows a motion of the object, by using first motion information obtained from a first detector to detect the motion of the image capturing apparatus and second motion information obtained from a second detector to detect the motion of the object, and a calculator configured to calculate prediction information on the motion of the object during an exposure time, by using the second information detected at multiple times before the exposure time. The controller is configured to use the prediction information and the first motion information obtained during the exposure time to control the optical element during the exposure time.

The present invention provides as still another aspect thereof a method, a computer program or a non-transitory computer-readable storage medium storing the control program to control an optical element as above in an image capturing apparatus.

Other aspects of the present invention will be apparent from the embodiments described below with reference to the drawings

DETAILED DESCRIPTION OF THE EMBODIMENTS

Exemplary embodiments of the present invention will be described below with reference to the accompanied drawings.

Embodiment 1

Figure 3:
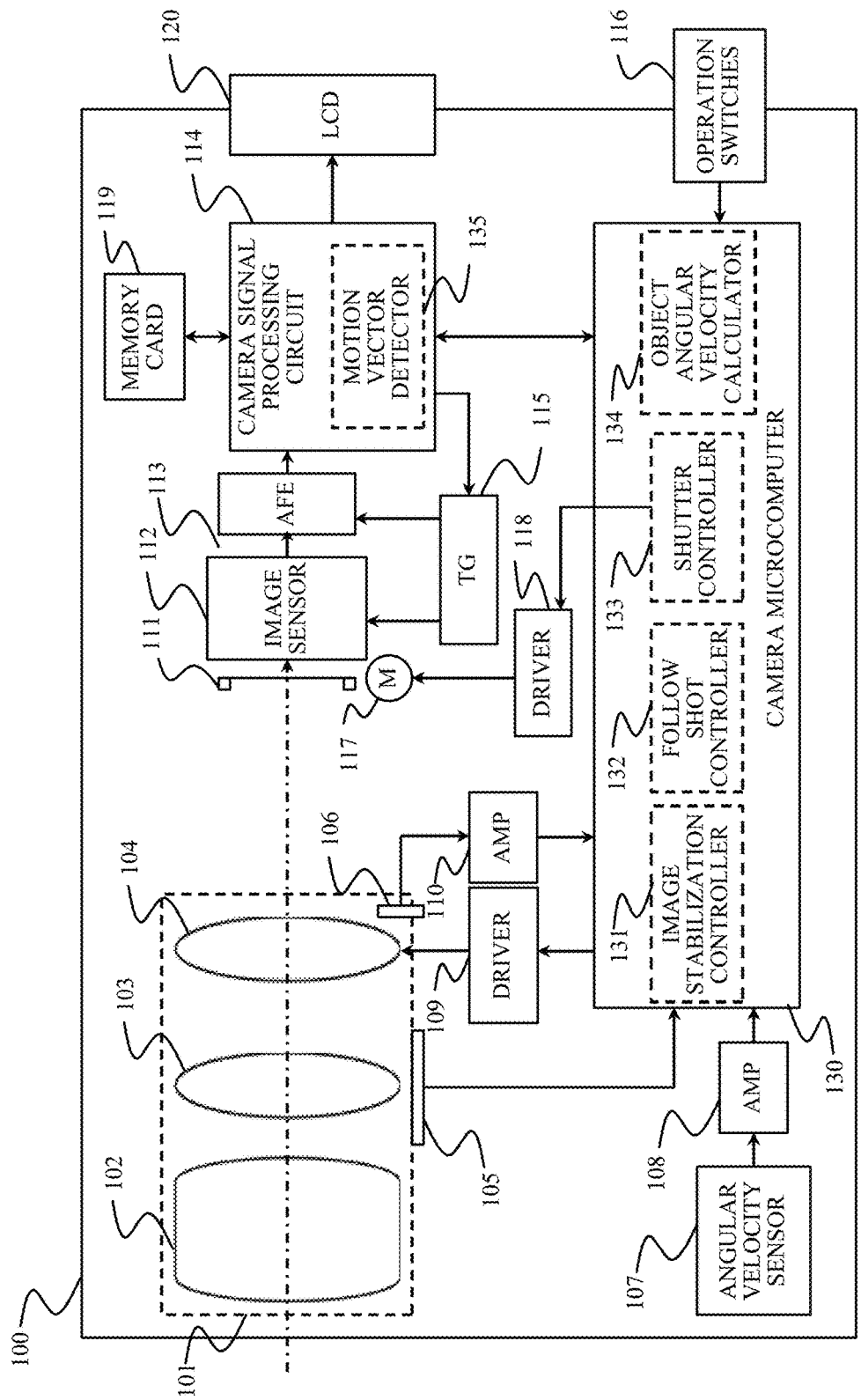
FIG. 3 is a block diagram showing a configuration of the camera of Embodiment 1.

FIG. 3 shows a configuration of a lens-interchangeable camera (hereinafter simply referred to as "a camera") 100 as an image capturing apparatus that is a first embodiment (Embodiment 1) of the present invention.

The camera 100 is provided with an image capturing lens unit 101 that is an image capturing optical system causing light from an object to form an optical image (object image). The image capturing lens unit 101 includes a main lens system 102, a zoom lens 103 that is movable in an optical axis direction in which an optical axis of the image capturing lens unit 101 extends to vary a focal length of the image capturing lens unit 101, and a focus lens (not shown) that is movable in the optical axis direction to perform focusing. The image capturing lens unit 101 further includes a shift lens 104 that is an optical element constituting part thereof.

The shift lens 104 is a shift element that is movable (or shiftable) in directions orthogonal to the optical axis (hereinafter correctively referred to as "a shift direction") to perform a follow shot assist. The follow shot assist is performed, in a follow shot to capture an object image of a moving object while a user changes a direction of the camera 100 by panning thereof, to reduce blur of the object image. The shift lens 104 also has an image stabilizing function to optically correct blur of the object image due to a shake of the camera 100 caused by user's hand jiggling (the shake is hereinafter referred to as "a camera shake"), by shifting the shift lens 104 in the directions orthogonal to the optical axis.

The camera 100 is provided with a zoom encoder 105, a shift position sensor 106, an angular velocity sensor 107, an angular velocity amplifier 108, a camera control microcomputer 130, a shift driver 109 and a shift position amplifier 110.

The zoom encoder 105 detects a position of the zoom lens 103 in the optical axis direction. The shift position sensor 106 detects a position of the shift lens 104 in the shift direction. The angular velocity sensor 107 as a first detector detects an angular velocity (angular velocity information) that is a motion velocity of the camera 100 in directions (pitch and yaw directions) orthogonal to the optical axis. The angular velocity amplifier 108 amplifies an output from the angular velocity sensor 107.

The camera control microcomputer (hereinafter simply referred to as "a camera microcomputer") 130 controls operations of the entire camera 100. The shift driver 109 includes a shift actuator such as a voice coil motor and its driver circuit and shifts the shift lens 104 by driving the shift actuator. The shift position amplifier 110 amplifies an output from the shift position sensor 106.

The camera 100 is further provided with a shutter 111, an image sensor 112, an analog signal processing circuit 113, a camera signal processing circuit 114, a timing generator 115, operation switches 116, a shutter motor 117 and a shutter driver 118.

The image sensor 112 is constituted by a photoelectric conversion element such as a CMOS sensor or a CCD sensor and photoelectrically converts the object image formed by the image capturing lens unit 101 to output an analog electric signal. The shutter 111 controls an exposure time (in other words, a length of time of an exposure) of the image sensor 112.

The analog signal processing circuit (AFE) 113 amplifies the analog signal output from the image sensor 112 and converts the amplified analog signal into an image capturing signal as a digital signal to output it to the camera signal processing circuit 114.

The camera signal processing circuit 114 produces a video signal (captured video image) by performing various image processing on the image capturing signal. The captured video (or a captured still image extracted therefrom) is recorded to a memory card 119 that is detachably attached to the camera 100 or is displayed on a monitor (hereinafter referred to as "an LCD") 120 constituted by a display element such as a liquid crystal panel.

The timing generator 115 sets operation times of the image sensor 112 and the analog signal processing circuit 113.

The operation switches 116 include various switches such as a power switch, a release switch and a mode selection switch, and dials. The camera 100 in this embodiment is switchable between a follow shot assist mode and a normal image capturing mode through the operation of the mode selection switch. The shutter motor 117 is driven by the shutter driver 118 to cause the shutter 111 to perform a charging operation (closing operation).

The camera signal processing circuit 114 includes a motion vector detector 135 as a second detector that detects a motion vector from frame images constituting the captured video image.

The camera microcomputer 130 further includes an image stabilization controller 131, a follow shot controller 132, a shutter controller 133 and an object angular velocity calculator 134. The object angular velocity calculator 134 corresponds to a calculator, and the follow shot controller 132 corresponds to a controller.

The image stabilization controller 131 performs an image blur correction control (image stabilization control) to control shift drive of the shift lens 104 so as to correct (reduce) the blur of the object image, in other words, image blur due to the camera shake.

The follow shot controller 132 controls the shift drive of the shift lens 104 to perform the follow shot assist.

The shutter controller 133 stops energization of a release electromagnetic magnet (not shown) through the shutter driver 118 to cause the shutter 111 to perform an opening operation from its charged state and controls the shutter motor 117 to cause the shutter 111 to perform the charging operation.

The object angular velocity calculator 134 calculates a relative object angular velocity as a measured angular velocity of the object (main object) with respect to the camera 100. The main object means an image capturing target. The camera microcomputer 130 performs focus lens control, aperture stop control and others.

In response to an ON-operation of the power switch in the operation switches 116 to turn power of the camera 100 on, the camera microcomputer 130 starts power supply to each of the above-described parts in the camera 100 and performs a necessary initial setting.

In the normal image capturing mode that is not the follow shot assist mode, the angular velocity sensor 107 detects the camera shake, and the image stabilization controller 131 shifts the shift lens 104 depending on a result of the detection to correct the image blur due to the camera shake.

Figure 4:
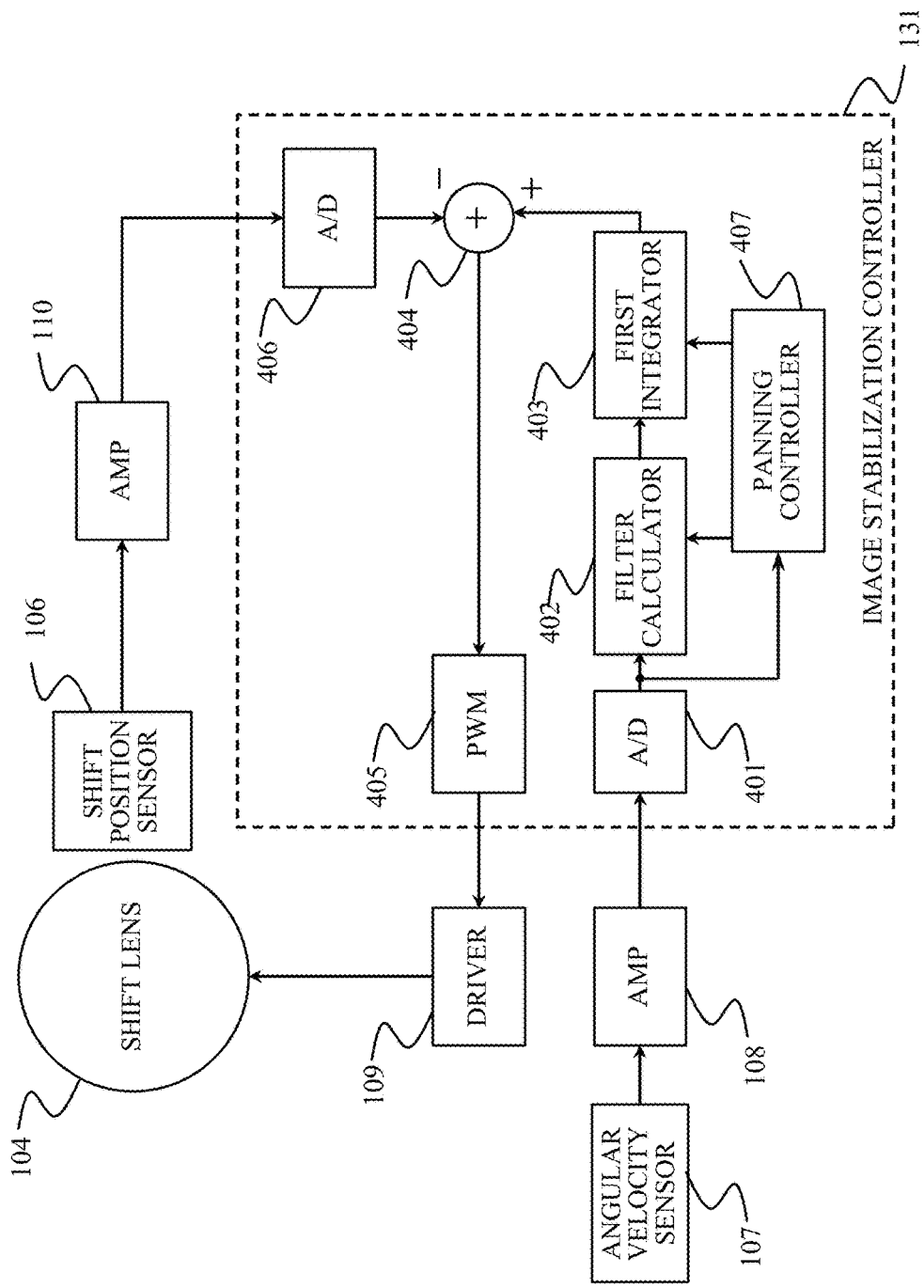
FIG. 4 is a block diagram showing a configuration of an image stabilizing system in the camera of Embodiment 1.

FIG. 4 shows a configuration of the image stabilizing system of the camera 100. In FIG. 4, components common to those in FIG. 3 are denoted by the same reference numerals as those in FIG. 3, and description thereof is omitted. Although an actual image stabilizing system has two systems shifting the shift lens 104 in two directions (pitch and yaw directions), FIG. 4 shows one thereof since configurations thereof are identical to each other.

An angular velocity A/D converter 401 converts an angular velocity signal (analog signal) output from the angular velocity sensor 107 (angular velocity amplifier 108) into angular velocity data as a digital signal to output it to a filter calculator 402. The angular velocity data is sampled at a frequency of about 1-10 kHz corresponding to a frequency of the camera shake.

The filter calculator 402, which is constituted by a high-pass filter (HPF), removes an offset component contained in the angular velocity data and changes a cutoff frequency of the HPF in response to an instruction from a panning controller 407 described below. A first integrator 403 converts the angular velocity data into angular displacement data, in order to produce target position data that is data of a target shift position of the shift lens 104.

A shift position A/D convertor 406 converts a shift position signal (analog signal) output from the shift position sensor 106 (shift position amplifier 110) into shift position data as a digital signal. A first adder 404 subtracts the shift position data (current shift position data) from the target position data of the shift lens 104 to calculate drive amount data of the shift lens 104.

A PWM outputter 405 outputs the calculated drive amount data to the shift driver 109. The shift driver 109 drives the shift actuator on a basis of the drive amount data to shift the shift lens 104 to the target shift position.

The panning controller 407 determines, from the angular velocity data obtained from the angular velocity sensor 107 (angular velocity A/D convertor 401), whether or not panning of the camera 100 is being performed. If it is determined that the panning of the camera 100 is being performed, the panning controller 407 changes the cutoff frequency of the filter calculator (HPF) 402 and adjusts the output of the first integrator 403.

Figure 5:
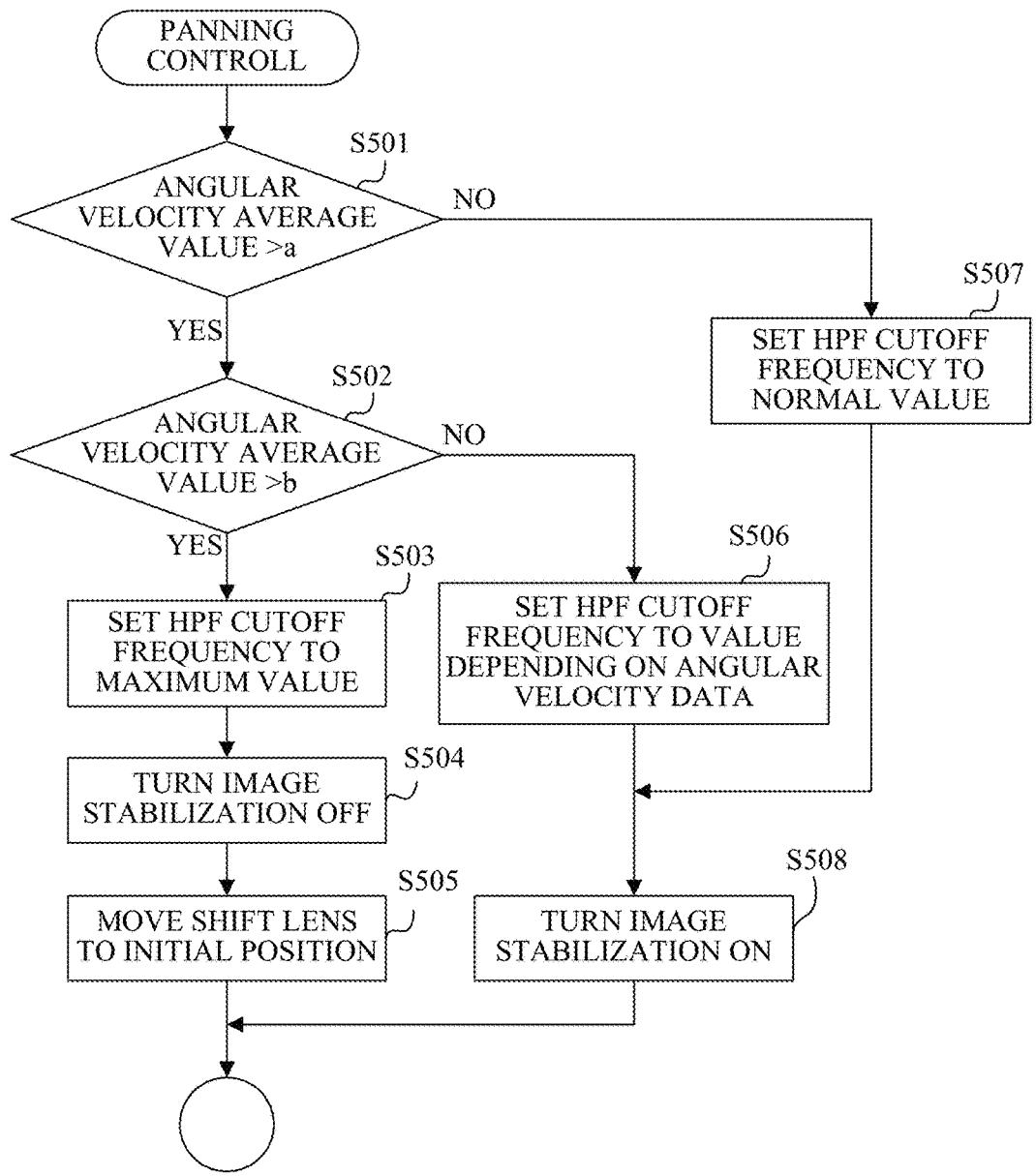
FIG. 5 is a flowchart showing a panning control in the camera of Embodiment 1.

FIG. 5 shows an example of a panning control performed by the panning controller 407. The panning controller 407 (that is, the camera microcomputer 130) performs this panning control according to a panning control program as a computer program.

At step S501, the panning controller 407 determines whether or not an average value of the angular velocity data taken in from the angular velocity A/D convertor 401 is larger than a predetermined value a. The average value (hereinafter referred to as "an angular velocity average value") is an average value of the angular velocity data sampled a predetermined number of times. If the angular velocity average value is equal to or lower than the predetermined value a, the panning controller 407 determines that the panning is not being performed and proceeds to step S507. On the other hand, when the angular velocity average value is larger than the predetermined value a, the panning controller 407 proceeds to step S502 to determine whether or not the angular velocity average value is larger than a predetermined value b (>a). If the angular velocity average value is equal to or lower than the predetermined value b, the panning controller 407 determines that a slow panning is being performed and proceeds to step S506. If the angular velocity average value is larger than the predetermined value b, the panning controller 407 determines that a fast panning is being performed and proceeds to step S503.

At step S503, the panning controller 407 sets the cutoff frequency of the filter calculator (HPF) 402 to a maximum value. Next at step S504, the panning controller 407 turns the image stabilization control off (that is, to a non-operation state). A reason for tuning the image stabilization control off when the fast panning is being performed is that shifting the shift lens 104 by regarding the fast panning as a large camera shake moves the captured image noticeably when the shift lens 104 reaches its shift end, which provides a feeling of strangeness to a user. Another reason therefore is that the fast panning moves the captured image largely and therefore the image blur due to the camera shake provides little feeling of strangeness to the user. Furthermore, gradually stopping the shift of the shift lens 104 after setting the cutoff frequency of the HPF to the maximum value enables preventing the image blur due to the camera shake from abruptly appearing in response to the turning off of the image stabilization control and thus providing a feeling of strangeness to the user.

The panning controller 407 having turned the image stabilization control off gradually changes at step S505 the output of the first integrator 403 from the current angular displacement data to initial position data. This gradual change of the output of the first integrator 403 gradually returns the shift lens 104 to its initial position where an optical axis of the shift lens 104 coincides with the optical axis of the image capturing lens unit 101.

The panning controller 407 having determined that the slow panning is being performed sets at step S506 the cutoff frequency of the filter calculator (HPF) 402 depending on the angular velocity data. This is because the image blur due to the camera shake is likely to be noticeable during the slow panning, and such image blur is necessary to be corrected. The cutoff frequency is set such that the image blur due to the camera shake can be corrected while an unnatural change of the captured image is prevented during the panning. Then, at step S508, the panning controller 407 turns the image stabilization control on (that is, to an operation state).

The panning controller 407 having determined that the angular velocity average value is equal to or lower than the predetermined value a (that is, that the panning is not being performed) and thus proceeded to step S507 sets the cutoff frequency of the filter calculator (HPF) 402 to a normal value. Then, the panning controller 407 proceeds to step S508 to turn the image stabilization control on.

Figure 7:
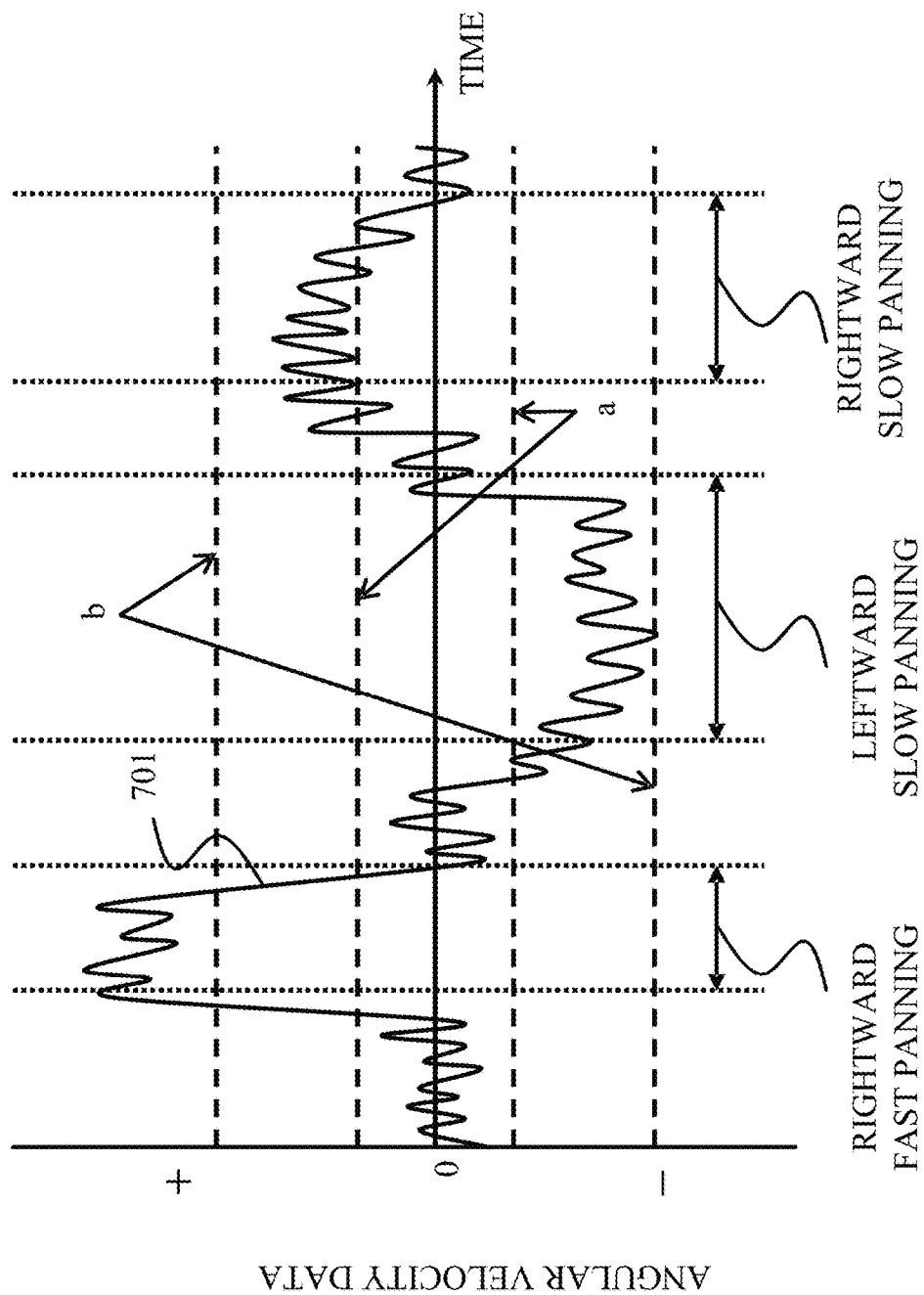
FIG. 7 shows panning determination thresholds in the camera of Embodiment 1.

FIG. 7 shows a relation between the angular velocity data in the yaw direction during the panning and the predetermined values a and b. Reference numeral 701 in FIG. 7 denotes the angular velocity data sampled. The angular velocity data has a positive (+) value when a rightward panning of the camera 100 is performed and has a negative (−) value when a leftward panning thereof is performed. In FIG. 7, a rightward fast (steep) panning, a rightward slow panning and a leftward slow panning are detected.

As shown in FIG. 7, the angular velocity data significantly deviates from its initial value (0) during the panning. The output of the first integrator 403 integrating this angular velocity data to calculate the target position data of the shift lens 104 extremely increases due to a DC-like offset component, which makes the shift lens 104 uncontrollable. Therefore, when the panning is detected, it is necessary to set the cutoff frequency of the HPF to be high so as to cut the offset component.

In particular, when the fast panning is being performed, such an uncontrollable state is likely to appear, so that it is necessary to set the cutoff frequency of the HPF to be high so as to prevent the output of the first integrator 403 from increasing.

The panning control described above enables, even during the panning, producing a captured image providing little sense of strangeness to the user. In FIG. 3, in response to setting of the follow shot assist mode by the operation of the mode selection switch in the operation switches 116, the motion vector detector 135 in the camera signal-processing circuit 114 detects the motion vector of the object image from sequential frame images. The detected motion vector is input to the follow shot controller 132 in the camera microcomputer 130. Along therewith, the follow shot controller 132 receives the angular velocity signal (first motion information) from the angular velocity sensor 107 (angular velocity amplifier 108).

The motion vectors output from the motion vector detector 135 during the follow shot include a motion vector of a main object image that is a capturing target image and a motion vector of a background image flowing in the back of the main object image. One of these motion vectors which shows a smaller motion amount than that shown by the other is the motion vector of the main object image. This motion vector (second motion information) of the main object image shows a displacement (motion) of the main object image on an image plane, that is, on the image sensor 112 during one frame period.

On the other hand, the angular velocity data output from the angular velocity sensor 107 corresponds to a panning velocity (follow shot velocity) of the camera 100. Calculating a difference between this angular velocity data and an angular velocity calculated from an amount of the displacement of the main object image on the image plane during the one frame period and a focal length of the image capturing lens unit 101 provides an angular velocity of the main object relative to the camera 100 (that is, the relative object angular velocity).

The object angular velocity calculator 134 calculates (acquires) the relative object angular velocity at each time at which the frame image is produced, that is, at a frame period. The object angular velocity calculator 134 sends, to the follow shot controller 132, information on a set of the calculated relative object angular velocity and a calculation time (acquisition time) at which the relative object angular velocity was calculated.

Figure 6:
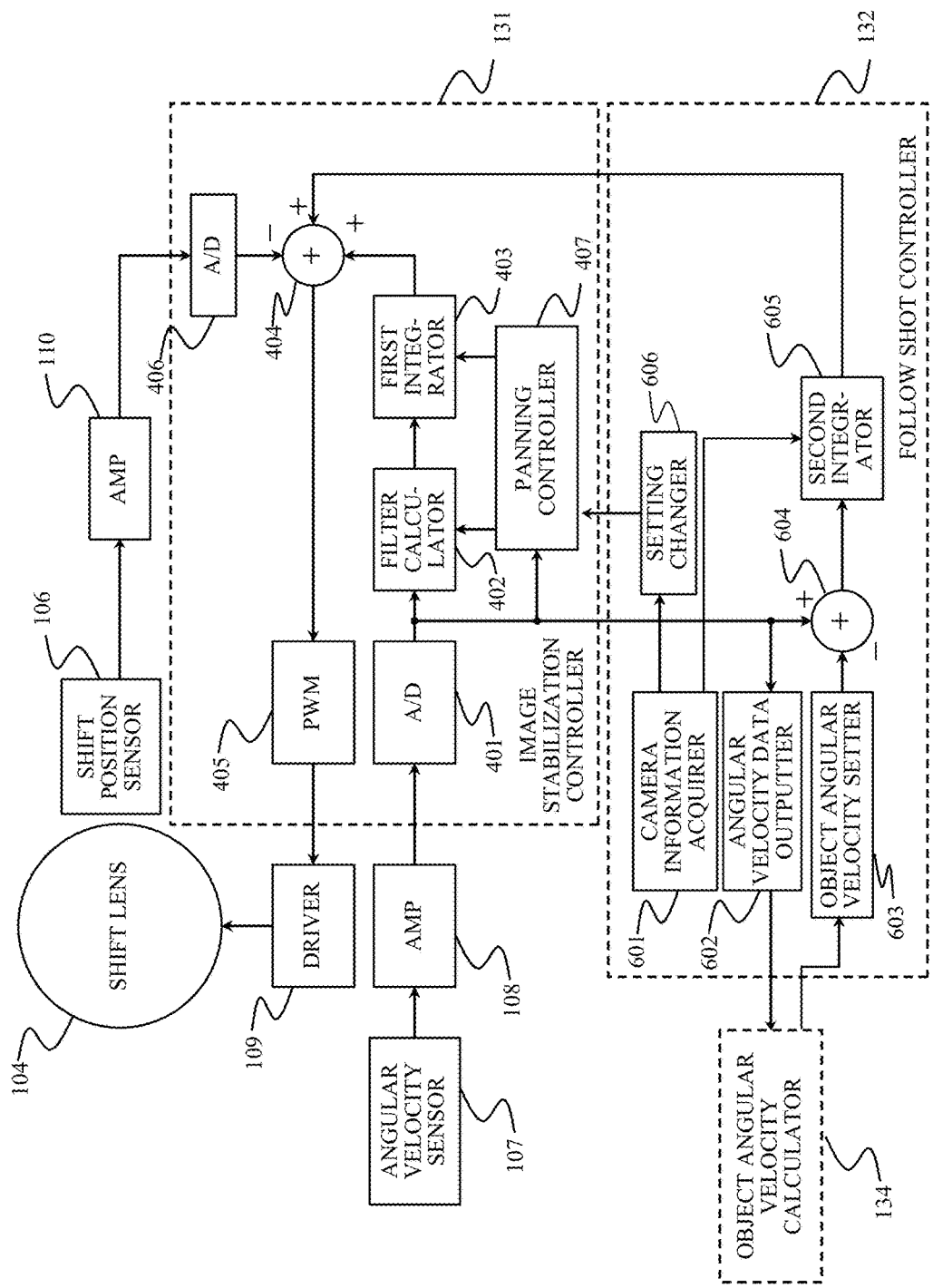
FIG. 6 is a block diagram showing a configuration of a shift drive control system in a follow shot assist mode in the camera of Embodiment 1.

FIG. 6 shows a configuration of a shift drive control system that performs a shift drive control of the shift lens 104 in the follow shot assist mode. In FIG. 6, components common to those in FIGS. 3 and 4 are denoted by the same reference numerals as those in FIGS. 3 and 4, and description thereof is omitted.

The follow shot controller 132 includes a camera information acquirer 601, an angular velocity data acquirer 601, an object angular velocity setter 603, a second adder 604, a second integrator 605 and a setting changer 606.

The camera information acquirer 601 acquires, from the operation switches 116, follow shot setting information showing that the follow shot assist mode is set by the operation of the mode selection switch and release information showing that image capturing is instructed by an operation of the release switch. The angular velocity data acquirer 601 samples the angular velocity data at predetermined times and outputs the sampled data to the object angular velocity calculator 134.

The object angular velocity setter 603 acquires information on the set (multiple sets) of the relative object angular velocity calculated by the object angular velocity calculator 134 before image capturing for recording (that is, before the exposure of the image sensor 112 for recording a captured still image) and its calculation time. The object angular velocity setter 603 holds (accumulates) the acquired information as an angular velocity history. In the following description, the exposure means the image capturing for recording. The object angular velocity setter 603 acquires a relative object angular velocity relative to the camera 100 as a predicted object angular velocity (prediction information) during the exposure time, by calculation or the like using the angular velocity history before the exposure. The relative object angular velocity calculated by the object angular velocity calculator 134 before the exposure is hereinafter referred to as "a pre-exposure relative object angular velocity", the angular velocity history before the exposure is hereinafter referred to as "a pre-exposure angular velocity history", and the relative object angular velocity during the exposure time is hereinafter referred to as "an in-exposure relative object angular velocity". The object angular velocity setter 603 sets the acquired in-exposure relative object angular velocity as a relative object angular velocity to be used for control of the shift dive of the shift lens 104 during the exposure time in the follow shot assist.

The second adder 604 calculates a difference between the angular velocity data from the angular velocity sensor 107 and the in-exposure relative object angular velocity set by the object angular velocity setter 603. The second integrator 605 performs an integral operation only during the exposure time. The setting changer 606 changes the setting of the panning controller 407 in response to a notice of acquisition of the follow shot setting information from the camera information acquirer 601. In response to setting of the follow shot assist mode by the operation of the mode select switch in the operation switches 116, the camera information acquirer 601 notifies the follow shot setting information to the setting changer 606. The setting changer 606 changes, in response to the notice of the follow shot setting information, the predetermined values a and b in the panning controller 407 in order not to limit a fast panning by the user.

Furthermore, the second adder 604 calculates the difference between the angular velocity data from the angular velocity sensor 107 and the in-exposure relative object angular velocity from the object angular velocity setter 603, and sends the difference to the second integrator 605.

The second integrator 605 starts, in response to the release information from the camera information acquirer 601, the integration operation of the above difference during the exposure time and outputs its result. The second integrator 605 outputs a value by which the shift lens 104 is located at its initial position at a time other than the exposure time. There is no problem in a shift of the shift lens 104 at the end of the exposure time from its position thereat to the initial position in a short time. That is, the analog signal from the image sensor 112 is read out immediately after the end of the exposure time and therefore the LCD 120 does not display the captured image, so that a motion of the captured image due to the shift of the shift lens 104 does not become a problem.

The output of the second integrator 605 is added to the output of the first integrator 403 by the first adder 404. Then, from the addition result, the shift position data of the shift lens 104 from the shift position sensor 106 (shift position A/D converter 406) is subtracted, thereby calculating the drive amount data of the shift lens 104.

In the follow shot assist mode, when the fast panning is actually performed by the user, the panning controller 407 immediately starts the panning control and turns the image stabilization control off as described at step S504 in FIG. 5. The shift lens 104 subjected to the panning control corrects the displacement amount of the object image on the image plane; the displacement amount corresponds to a difference between the angular velocity of the panning of the camera 100 and the relative object angular velocity that is the angular velocity of the main object (hereinafter simply referred to as an "object") relative to the camera 100. With this panning control, a difference, which causes an unsuccessful follow shot, between the panning velocity of the camera 100 and a motion velocity of the object during the exposure time is cancelled out by the shift drive of the shift lens 104, which results in a successful follow shot.

The object angular velocity setter 603 takes a release time lag and the exposure time into consideration, when setting the in-exposure relative object angular velocity by using the pre-exposure angular velocity history obtained from the object angular velocity calculator 134 and accumulated before the exposure.

For example, when the follow shot is performed for an object in uniform linear motion with the camera 100 located in a direction orthogonal to a motion direction of the object, the angular velocity measured from the camera 100 changes continuously. For this reason, the measured angular velocity of the object and an actual angular velocity thereof during the exposure time do not become equal to each other. Accordingly, leaving this change of the angular velocity (that is, an angular acceleration) out of consideration makes it impossible to achieve a sufficient correction by the shift drive of the shift lens 104.

Figure 8:
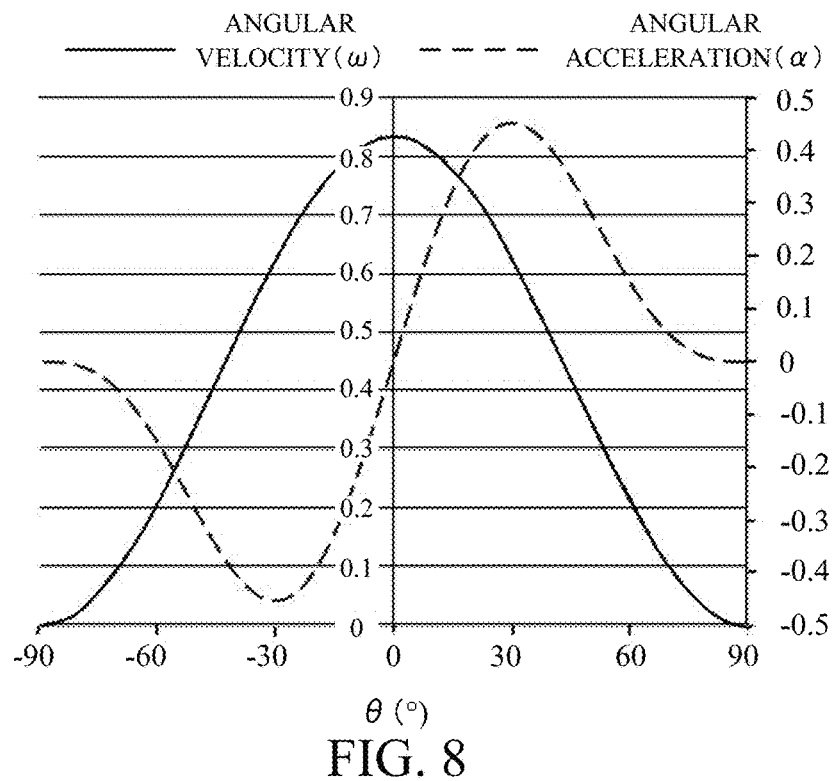
FIG. 8 is a graph showing a relative object angular velocity and its change (angular acceleration) in Embodiment 1.
Figure 9:
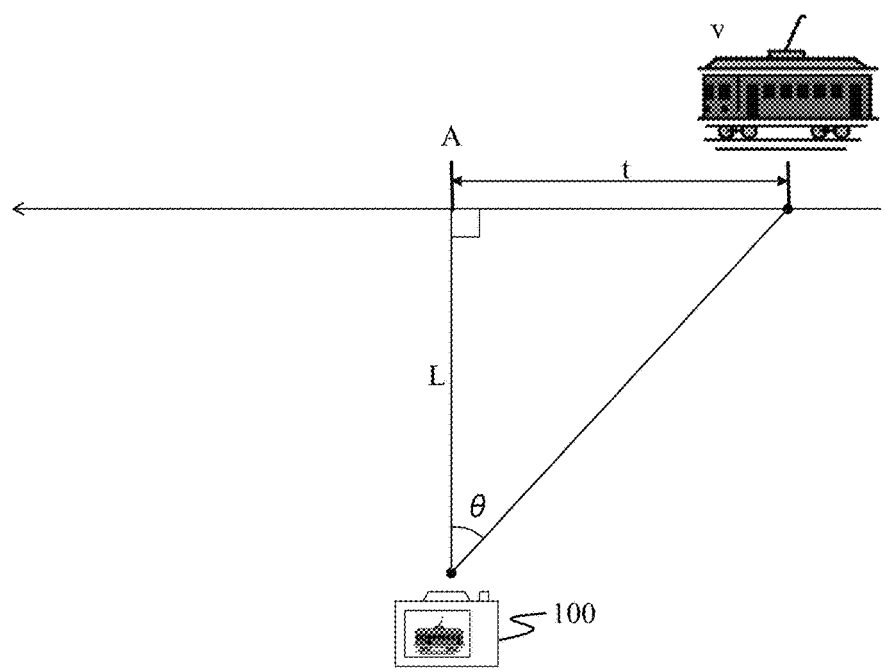
FIG. 9 shows the relative object angular velocity in Embodiment 1.

FIG. 8 shows a change of an angular velocity ω of an object (train) in uniform linear motion as shown in FIG. 9. The angular velocity ω is measured from the camera 100 located in the direction orthogonal to the motion direction of the object. In FIG. 9, the object is in the uniform linear motion leftward at a velocity v. A point (hereinafter referred to as "an origin") A shows a position where a distance from the camera 100 to the object becomes shortest on a motion track of the object in the uniform linear motion. L denotes the distance from the camera 100 to the origin A (that is, the shortest distance from the camera 100 to the motion track). In addition, θ denotes an angle formed by a direction from the camera 100 to the object (that is, a direction of the camera 100) with respect to a direction from the camera 100 to the origin A, in other words, with respect to the direction orthogonal to the motion direction of the object. The angle θ is hereinafter referred to as "a panning angle". The panning angle θ has a positive (+) value on a right side further than the origin A and has a negative (−) value on a left side further than the origin A.

In FIG. 8, a horizontal axis shows the panning angle θ that becomes 0 when the object in FIG. 9 is located at the origin A, and a central vertical axis shows the angular velocity ω of the object. A solid line shows a change of the angular velocity ω. Furthermore, a right vertical axis shows an angular acceleration α, and a dashed line graph shows a change of the angular acceleration α.

The change of the angular acceleration α herein is a change of an angular acceleration of the object depending on the position thereof relative to the position of the camera 100. FIG. 8 shows an example of the angular velocity ω and the angular acceleration α in a case where the shortest distance from the camera 100 to the origin A is 20 m and the object is in uniform linear motion at a velocity of 60 km/h.

In FIG. 8, when the object passes the origin A)(θ=0°), the angular velocity ω becomes maximum and the angular acceleration α becomes 0. When the object passes a position of θ=+30°, the angular acceleration α becomes maximum. When the object passes a position of θ=−30°, the angular acceleration α becomes minimum.

This relation between the panning angle θ and the angular velocity ω and angular acceleration α does not depend on the above-described shortest distance and the motion velocity of the object.

Figure 2:
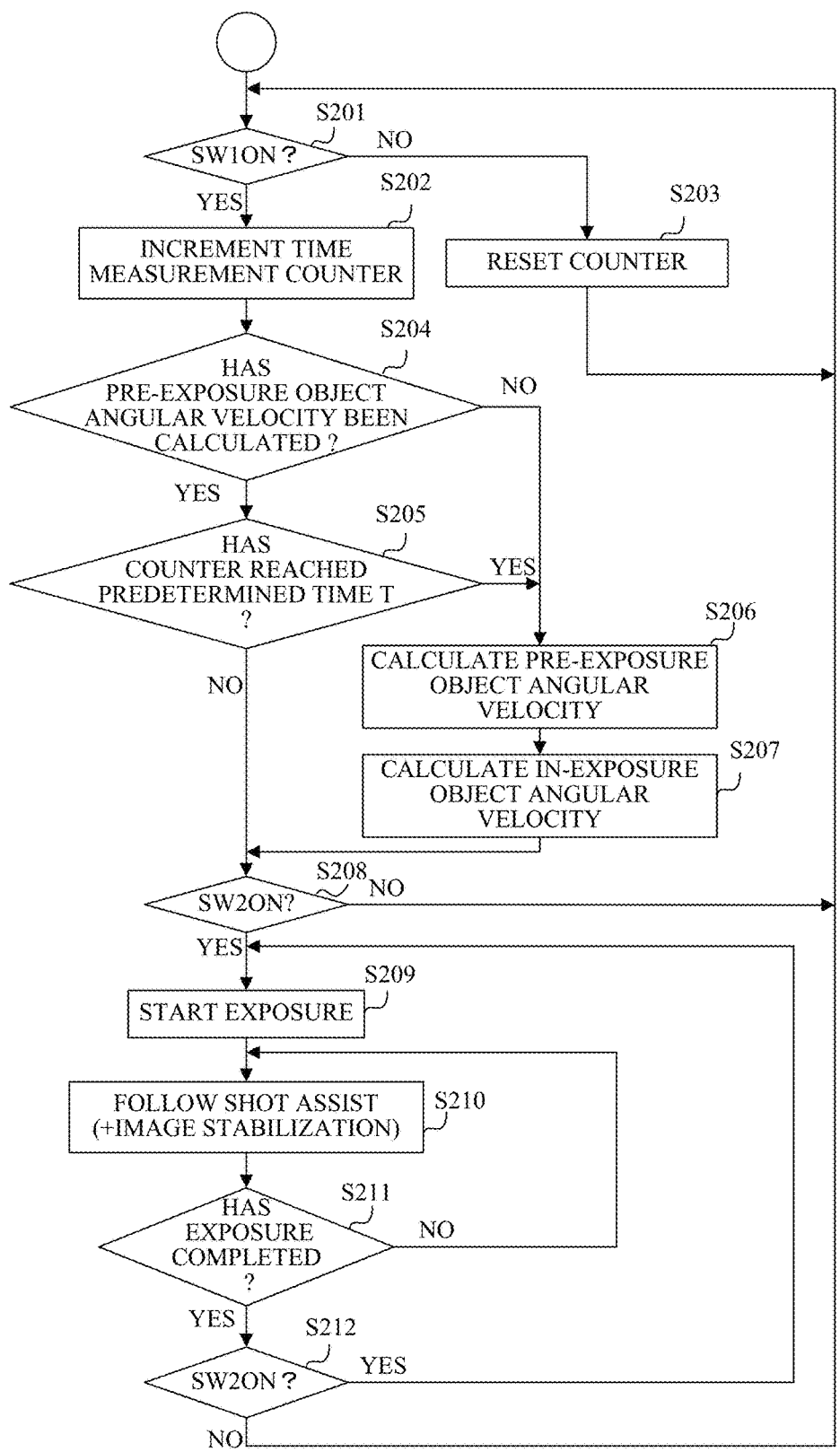
FIG. 2 is a flowchart showing a follow shot assist process in the camera of Embodiment 1.

FIG. 2 is a flowchart showing a follow shot assist process performed by the camera microcomputer 130 in the follow shot assist mode. The camera microcomputer 130 executes this process according to a follow shot assist control program that is a computer program. The user performs panning of the camera 100 to follow a moving object.

At step S201, the camera microcomputer 130 determines whether or not a half-press operation (SW1ON) of the release switch is performed. If the SW1ON is performed, the camera microcomputer 130 proceeds to step S202 to increment a time measurement counter and then proceeds to step S204. If the SW1ON is not performed, the camera microcomputer 130 proceeds to step S203 to reset the time measurement counter and then returns to step S201.

At step S204, the camera microcomputer 130 checks whether or not the pre-exposure relative object angular velocity (in FIG. 2 simply written as "pre-exposure object angular velocity") has been already calculated by the object angular velocity calculator 134. When the pre-exposure relative object angular velocity has been already calculated, the camera microcomputer 130 proceeds to step S205 to check whether or not the time measurement counter has reached a predetermined time T. If the pre-exposure relative object angular velocity has not been yet calculated or the time measurement counter has reached the predetermined time T even though the pre-exposure relative object angular velocity has been already calculated (that is, a time during the SW1ON is performed is longer than the predetermined time T), the camera microcomputer 130 proceeds to step S206.

At step S206, the camera microcomputer 130 causes the object angular velocity calculator 134 to calculate the pre-exposure relative object angular velocity. This process as a first process causes the object angular velocity calculator 134 to calculate the relative object angular velocity before the exposure started in response to SW2ON mentioned below and causes the object angular velocity setter 603 to acquire the pre-exposure angular velocity history.

A reason for recalculating the pre-exposure relative object angular velocity when the time measurement counter has reached the predetermined period T is to take into consideration a possibility that the object velocity changes within the predetermined time T. The pre-exposure relative object angular velocity calculated by the object angular velocity calculator 134 is sent, at each calculation thereof, to the object angular velocity setter 603 in the follow shot controller 132. If the time measurement counter has not yet reached the predetermined period T at step S205, the camera microcomputer 130 proceeds to step S208.

At step S207 after step S206, the camera microcomputer 130 causes the object angular velocity setter 603 to set the in-exposure relative object angular velocity (in FIG. 2 simply written as "in-exposure object angular velocity"). This process (angular velocity setting process) as a second process will be described in detail below. The camera microcomputer 130 then proceeds to step S208.

At step S208, the camera microcomputer 130 determines whether or not a full-press operation (SW2ON) of the release switch is performed. If the SW2ON is not performed, the camera microcomputer 130 returns to step S201. On the other hand, if the SW2ON is performed, the camera microcomputer 130 proceeds to step S209 to start the exposure by causing the shutter 111 to open through the shutter controller 133.

Furthermore, at step S210, the camera microcomputer 130 causes the follow shot controller 132 to control the shift drive of the shift lens 104 depending on the in-exposure relative object angular velocity set at step S207, thereby performing the follow shot assist to correct the displacement amount of the object image on the image plane. In this control of the shift drive, if a determining that the fast panning is being performed is made at step S502 in FIG. 5, the camera microcomputer 130 performs the shift drive of the shift lens 104 in order to correct the image blur due to the camera shake through the image stabilization controller 131.

Next, at step S211 the camera microcomputer 130 determines whether or not the exposure has completed. If the exposure has completed, the camera microcomputer 130 proceeds to step S212. If the exposure has not yet completed, the camera microcomputer 130 returns to step S210.

At step S212, the camera microcomputer 130 determines again whether or not the SW2ON is performed. If the SW2ON is performed, the camera microcomputer 130 returns to step S209 to perform a next exposure (that is, to perform image capturing of a next image in continuous shot). On the other hand, if the SW2ON is not performed, the camera microcomputer 130 returns to step S201.

Figure 1:
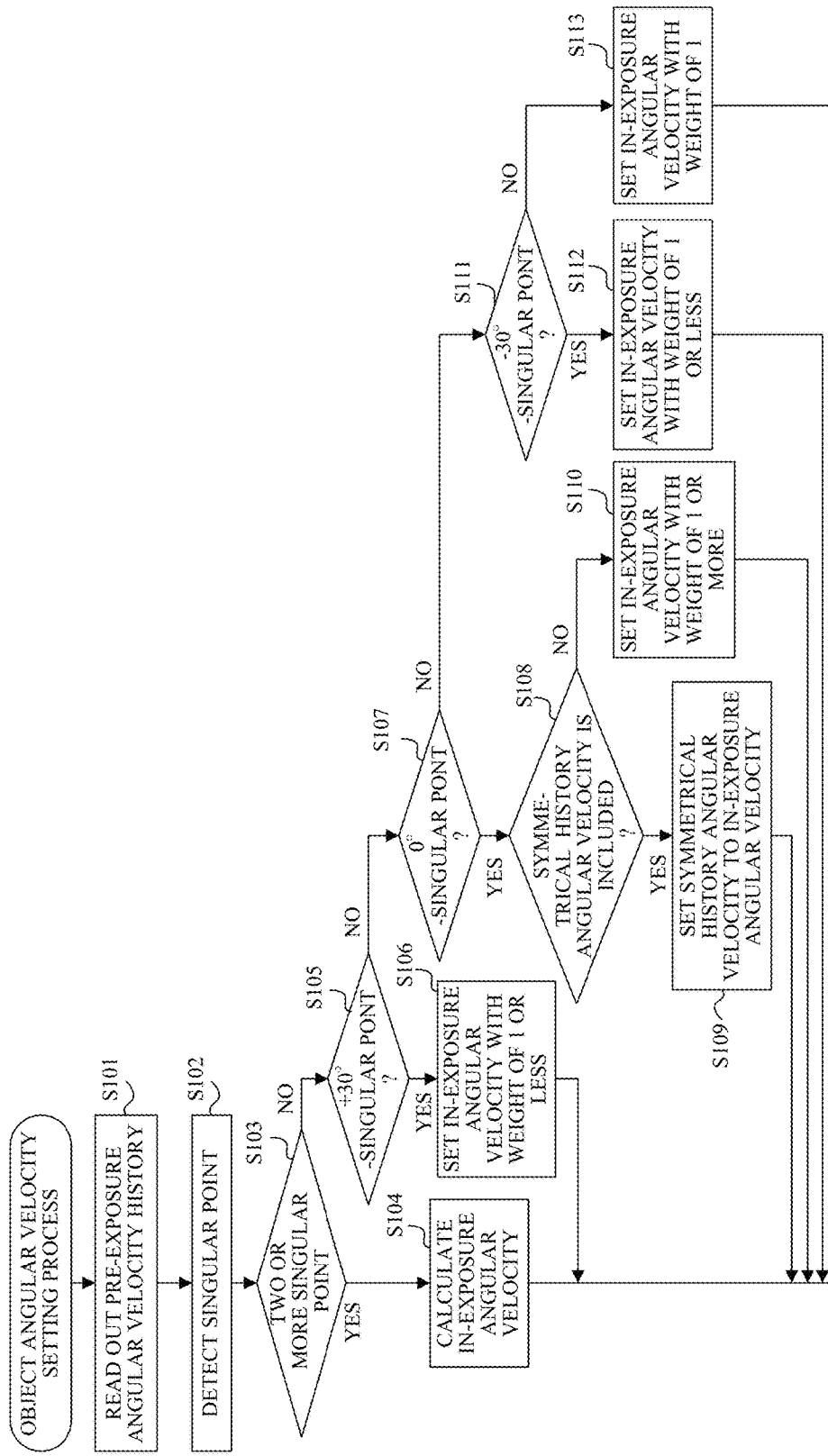
FIG. 1 is a flowchart showing an angular velocity setting process in a camera that is Embodiment 1 of the present invention.

FIG. 1 is a flowchart showing the angular velocity setting process performed by the object angular velocity setter 603 at step S207 in FIG. 2. The object angular velocity setter 603 (that is, the camera microcomputer 130) executes this process according to part of the follow shot assist control program.

At step S101, the object angular velocity setter 603 receiving an instruction of setting the in-exposure relative object angular velocity from the camera microcomputer 130 reads out the pre-exposure angular velocity history that the object angular velocity setter 603 has previously acquired from the object angular velocity calculator 134 and accumulated.

Then, at step S102, the object angular velocity setter 603 detects, from the multiple sets of the pre-exposure relative object angular velocity and the calculation time contained in the read-out pre-exposure angular velocity history, a singular point of the angular velocity. In FIG. 8, at three singular points of the angular velocity where the panning angles θ are 0°, +30° and −30°, three types of specific changes in the angular acceleration that is a temporal change rate of the angular velocity are generated.

The object angular velocity setter 603 calculates the angular acceleration (angular acceleration information) by dividing a difference of the relative object angular velocities at two mutually adjacent calculation times in the pre-exposure angular velocity history by a time interval between the two mutually adjacent calculation times. The object angular velocity setter 603 performs this angular acceleration calculation for multiple sets of the two mutually adjacent calculation times to calculate temporal changes of the angular acceleration. Then, the object angular velocity setter 603 performs a process to detect, in the angular acceleration that temporally changes, a positive local maximum value (that is, a change from increase to decrease at θ=+30°) and a negative local maximum value (that is, a change from decrease to increase at θ=−30°). The object angular velocity setter 603 also detects, in the angular acceleration, a change between positive and negative (that is, a change from one of positive and negative to the other at θ=0°).

At step S103, the object angular velocity setter 603 determines whether or not the number of the singular points detected by the above-described singular point detection process is two or more. That is, the object angular velocity setter 603 determines whether or not the singular points corresponding to, among the panning angles θ=0°, +30° and −30°, "0", +30° and −30°", "+30° and 0°" or "0° and −30°" are detected. If the two or more singular points are detected, the object angular velocity setter 603 proceeds to step S104, and otherwise proceeds to step S105.

At step S104, the object angular velocity setter 603 calculates (sets) the in-exposure relative object angular velocity ω by using following expression (1).

$$\omega = \frac{\sqrt{3}\, t_{30}}{3 t_{30}^2 + (t_c + t_{lag})^2} \quad (1)$$

In expression (1), $t_{30}$ denotes a length of time taken by the object to move from a position corresponding to one of the panning angles 74 =+30° and −30° at which the singular point is detected, to a position corresponding to the panning angle θ=0°. Furthermore, $t_c$ denotes a length of time from a time point when the object passes the position corresponding to the panning angle θ=0° to a time point when a last one of the pre-exposure relative object angular velocities is detected, that is, to a time point immediately before the release information is input. In addition, $t_{lag}$ denotes a length of time from the time point when the last one of the pre-exposure relative object angular velocities is detected to a midpoint of the exposure time. Although the midpoint of the exposure time corresponds to a time point of half of the exposure time in the following description, the midpoint thereof may be a time point other than the point of half thereof as long as the midpoint is within the exposure time.

Figure 10:
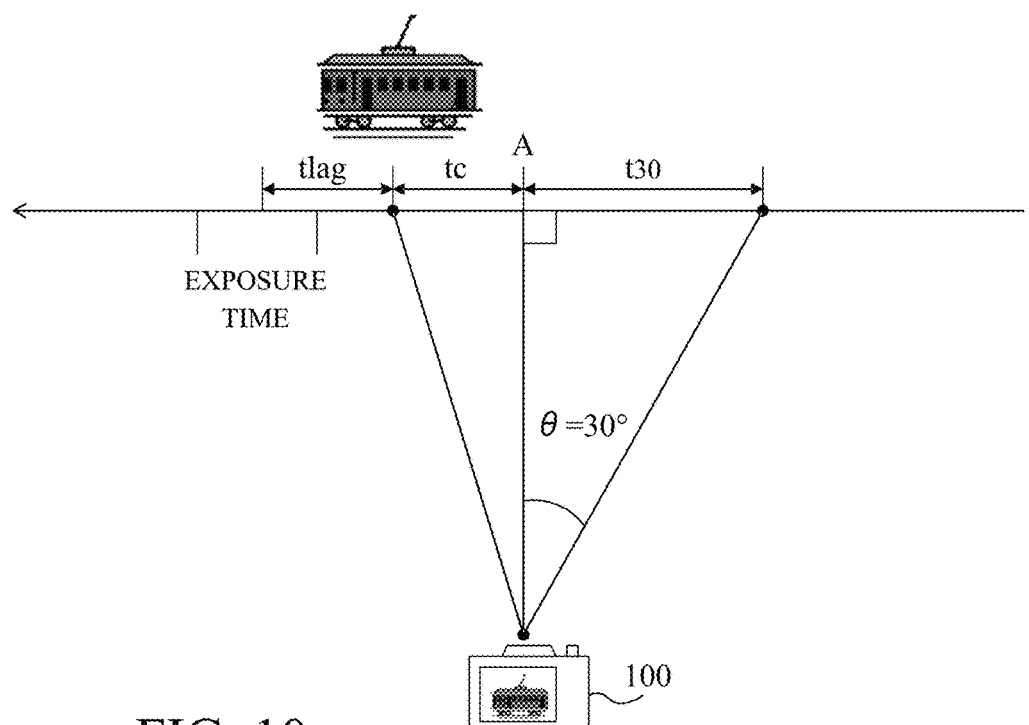
FIG. 10 shows singular points in Embodiment 1.

FIG. 10 shows $t_{30}$, $t_c$ and $t_{lag}$ in a case where $t_{30}$ is a length of time taken by the object to move from the position of θ=+30° to the position of θ=0°.

Derivation of expression (1) will be described with reference to FIG. 9. In FIG. 9, v denotes the motion velocity of the object (hereinafter referred to as "an object velocity"), L denotes the shortest distance between the motion track of the object (origin A) and the camera 100, and t denotes a length of time taken by the object to move from a position of θ to the origin A. The angular velocity ω of the object, which is a temporal differentiation of θ, is calculated as follows.

$$\omega = \frac{d\theta}{dt}$$

$$\tan\theta = \frac{vt}{L}$$

$$\theta = \arctan\left(\frac{vt}{L}\right)$$

When u is defined as follows:

$$u = \frac{vt}{L},$$

differentiating arctan(u) by u and developing the differentiation result by u again gives the following expression.

$$\frac{d\theta}{du} = \frac{1}{1+u^2}$$
$$= \frac{L^2}{L^2 + (vt)^2}$$

Differentiating u by t gives:

$$\frac{du}{dt} = \frac{v}{L},$$

applying it to a chain rule of differentiation gives the following expression.

$$\omega = \frac{d\theta}{dt} = \frac{d\theta}{du} \cdot \frac{du}{dt}$$
$$= \frac{Lv}{L^2 + (vt)^2}$$

Calculating L in FIG. 10 gives:

$$L = \sqrt{3vt_{30}}, \text{ and}$$

applying this L and $t = t_c + t_{lag}$ to the above expression of $\omega$ gives expression (1).

At step S105, the object angular velocity setter 603 determines whether or not the singular point corresponding to $\theta = +30°$ has been detected. If this singular point has been detected, the object angular velocity setter 603 proceeds to step S106, and otherwise proceeds to step S107.

At step S106, the object angular velocity setter 603 calculates the in-exposure relative object angular velocity $\omega$ by using following expression (2). Specifically, the object angular velocity setter 603 first calculates a difference $(\omega_n - \omega_{n-1})$ of the pre-exposure relative object angular velocities calculated at two newest calculation times in the pre-exposure angular velocity history. Next, the object angular velocity setter 603 calculates a relative object angular velocity $(\omega_n - \omega_{n-1})t_{lag}/t_f$ by using the length of time $t_{lag}$ taken by the object to move from the time point when the last pre-exposure relative object angular velocity is detected to the midpoint of the exposure time. Thereafter, the object angular velocity setter 603 calculates (sets) the in-exposure relative object angular velocity $\omega$, which is a final value, by weighting the calculated relative object angular velocity $(\omega_n - \omega_{n-1})$ by a weight W of 1 or less.

$$\omega = \frac{W(\omega_n - \omega_{n-1})t_{lag}}{tf} \quad (2)$$

In expression (2), $\omega_n$ denotes the angular velocity calculated at a newest calculation time of the two newest calculation times, and $\omega_{n-1}$ denotes the angular velocity calculated at a one previous calculation time from the newest calculation time. Furthermore, $t_f$ denotes a length of time between the newest calculation time corresponding to $\omega_n$ and the one previous calculation time corresponding to $\omega_{n-1}$.

At step S107, the object angular velocity setter 603 determines whether or not the singular point corresponding to $\theta = 0°$ has been detected. If this singular point has been detected, the object angular velocity setter 603 proceeds to step S108, and otherwise proceeds to step S111.

At step S108, the object angular velocity setter 603 determines whether or not the pre-exposure angular velocity history includes a relative object angular velocity that is symmetrical (hereinafter referred to as "a symmetrical history angular velocity") relative to $\theta = 0°$ as a central point of symmetry, with a relative object angular velocity at the midpoint of the exposure time. If the angular velocity history includes the symmetrical history angular velocity, the object angular velocity setter 603 proceeds to step S109, and otherwise proceeds to step S110.

Figure 11:
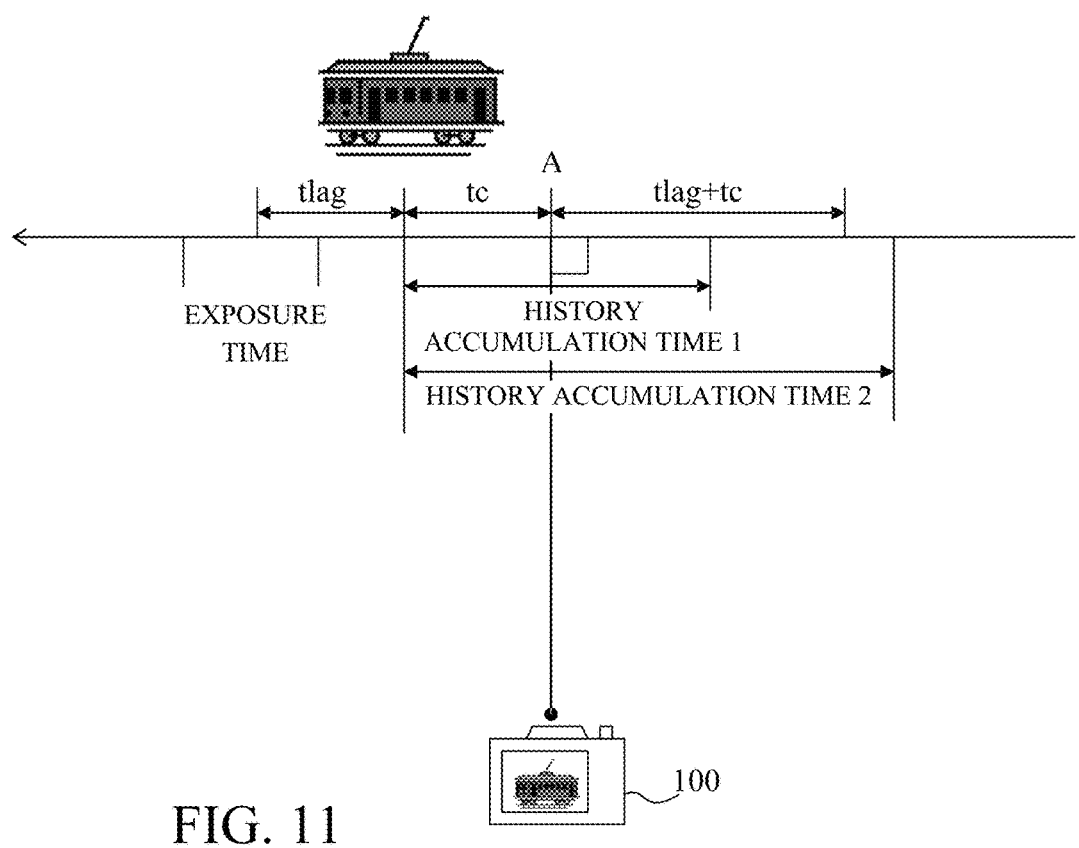
FIG. 11 shows a determination of a 0°-singular point in Embodiment 1.

FIG. 11 shows the symmetrical history angular velocity. A time during which the angular velocity history is accumulated is referred to as "a history accumulation time". A history accumulation time 1 shown in FIG. 11 is shorter than $t_{lag} + t_c$ on the right side further than the origin A, so that the angular velocity history does not include the symmetrical history angular velocity. On the other hand, a history accumulation time 2 is longer than $t_{lag} + t_c$ on the right side further than the origin A, so that the angular velocity history includes the symmetrical history angular velocity.

At step S109, the object angular velocity setter 603 sets the symmetrical history angular velocity as the in-exposure relative object angular velocity $\omega$.

At step S110, the object angular velocity setter 603 sets the in-exposure relative object angular velocity $\omega$ by using expression (2) in which the weight W is 1 or more.

At step S111, the object angular velocity setter 603 determines whether or not the singular point corresponding to $\theta = -30°$ has been detected. If this singular point has been detected, the object angular velocity setter 603 proceeds to step S112, and otherwise proceeds to step S113.

At step S112, the object angular velocity setter 603 sets the in-exposure relative object angular velocity $\omega$ by using expression (2) in which the weight W is 1 or less.

At step S113, the object angular velocity setter 603 sets the in-exposure relative object angular velocity $\omega$ by using expression (2) in which the weight W is 1.

This embodiment enables performing the follow shot assist allowing a good follow shot with reduced object image blur even when the angular velocity of the object measured from the camera 100 changes.

Embodiment 2

Next, description will be made of a camera as an image capturing apparatus that is a second embodiment (Embodiment 2) of the present invention. A configuration of the camera of this embodiment is common to that of the camera 100 of Embodiment 1, and therefore components of the camera in this embodiment are denoted by the same reference numerals as those in Embodiment 1.

Embodiment 1 described the case where the object angular velocity calculator 134 sends the pre-exposure relative object angular velocity and the calculation time at which the calculation thereof was made to the follow shot controller 132 and where the follow shot controller 132 accumulates the sets of the pre-exposure relative object angular velocity and the calculation time as the pre-exposure angular velocity history. Embodiment 2 will describe a case where the object angular velocity calculator 134 sends to the follow shot controller 132, in addition to the pre-exposure relative object angular velocity and the calculation time, an object distance (distance information) at the calculation time and a change amount of the panning angle θ shown in FIG. 9 from a previous calculation time of the relative object angular velocity and where the follow shot controller 132 accumulates the sets of the pre-exposure relative object angular velocity, the calculation time, the object distance and the change amount of the panning angle θ as the pre-exposure angular velocity history. The object distance can be calculated from information on, for example, the positions of the zoom lens 103 and the focus lens (not shown) in the image capturing lens unit 101. The change amount of the panning angle θ can be calculated by integrating the angular velocity data. In this embodiment, an autofocus operation is performed in order to acquire the object distance, and thereby an in-focus state of the image capturing lens unit 101 for a moving object is maintained such that an accurate object distance of the moving object can be calculated. Furthermore, the object distance may be acquired from position information acquired from GPSs provided to both the object and camera.

Figure 12:
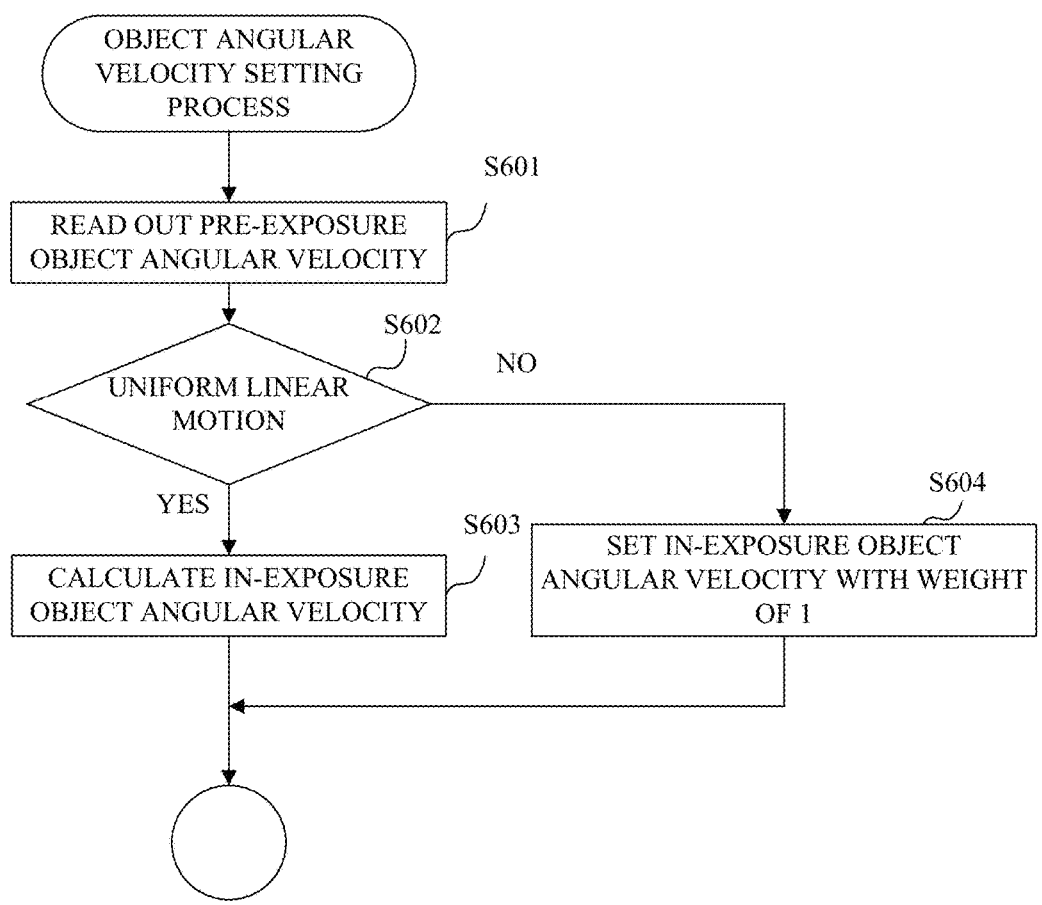
FIG. 12 is a flowchart showing an angular velocity setting process in a camera of Embodiment 2 of the present invention.

FIG. 12 is a flowchart showing an angular velocity setting process (second process) performed by the object angular velocity setter 603. The object angular velocity setter 603 (that is, the camera microcomputer 130) executes this process according to part of the follow shot assist control program described in Embodiment 1.

At step S601, the object angular velocity setter 603 receiving an instruction of setting the in-exposure relative object angular velocity from the camera microcomputer 130 reads out the pre-exposure angular velocity history that the object angular velocity setter 603 has previously obtained from the object angular velocity calculator 134 and accumulated.

At step S602, the object angular velocity setter 603 calculates, from the multiple sets of the pre-exposure relative object angular velocity and the calculation time contained in the read-out pre-exposure angular velocity history, an angular acceleration of the object which is a temporal change rate of its angular velocity, and determines from the calculation result whether or not the object is in uniform linear motion. Specifically, the object angular velocity setter 603 determines whether or not a temporal change of the angular acceleration is equivalent to that in the graph of the angular acceleration shown in FIG. 8. If the object is in uniform linear motion, the object angular velocity setter 603 proceeds to step S603. If the object is not in uniform linear motion, the object angular velocity setter 603 proceeds to step S604.

At step S603, the object angular velocity setter 603 calculates the in-exposure relative object angular velocity ω by using the object distances at two newest calculation times and the change amount of the panning angle θ between these calculation times in the pre-exposure angular velocity history and using following expressions (3) to (8).

$$\omega = \frac{Lv}{L^2 + (vt)^2} \quad (3)$$

$$L = \frac{mn \sin\Delta\theta}{D} \quad (4)$$

$$v = \frac{D}{t_f} \quad (5)$$

$$D = \sqrt{m^2 - 2mn \cos\Delta\theta + n^2} \quad (6)$$

$$t = \left| \frac{\sqrt{m^2 - L^2}}{v} - t_{lag} \right|$$

$m < n$ and $\sqrt{m^2 - L^2} + \sqrt{n^2 - L^2} \neq D$ \quad (7)

$$t = \frac{\sqrt{m^2 - L^2}}{v} + t_{lag}$$

$n > m$ or $m \leq n$ and $\sqrt{m^2 - L^2} + \sqrt{n^2 - L^2} = D$ \quad (8)

Description will be made of symbols in expressions (3) to (8) by using FIGS. 13A to 13D. L and v respectively represent, as also shown in FIG. 9, the shortest distance from a camera 100' of this embodiment to the motion track of the object in uniform linear motion (that is, to the origin A) and the velocity of the object (object velocity) in uniform linear motion. Furthermore, t represents a length of time from when the object passes the origin A to the midpoint of the exposure time, m represents an object distance at a certain time (that is, the calculation time at which the pre-exposure relative object angular velocity is calculated), and n represents an object distance at a time before m (that is, a previous calculation time at which the pre-exposure relative object angular velocity is calculated). Moreover, Δθ0 represents a change amount of the panning angle θ from a point (hereinafter referred to as "a first point") when the object distance is n to a point (hereinafter referred to as "a second point") when the object distance is m. D represents a motion distance from the first point to the second point, and $t_f$ represents a length of time from the first point to the second point. In addition, $t_{lag}$ represents a length of time from the second point to the midpoint of the exposure time.

Figure 13A:
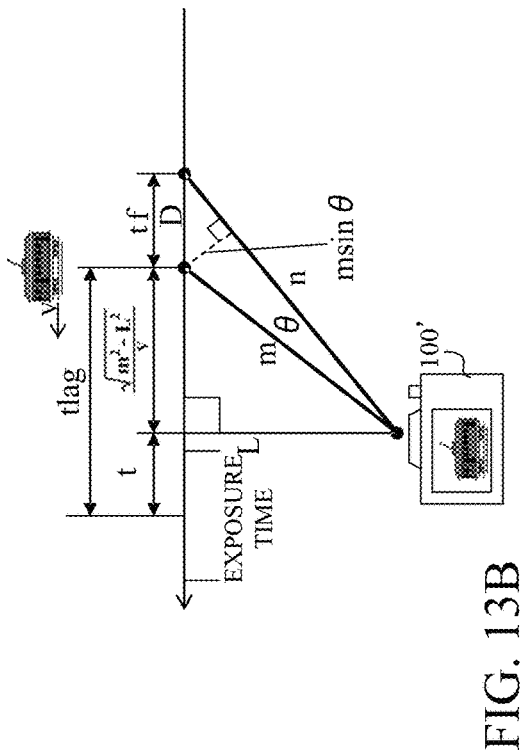
FIGS. 13A to 13D each show a distance between two points and an angle therebetween in Embodiment 2.
Figure 13B:
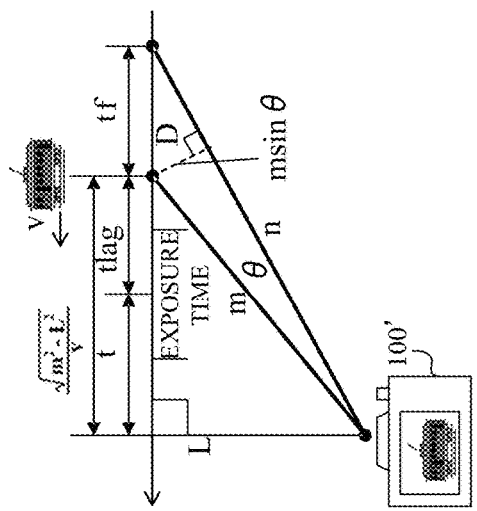

FIG. 13A shows a case where $$\frac{\sqrt{m^2 - L^2}}{v} \geq t_{lag}$$

in expression (7), and FIG. 13B shows a case where $$\frac{\sqrt{m^2 - L^2}}{v} < t_{lag}$$

in expression (7).

Figure 13C:
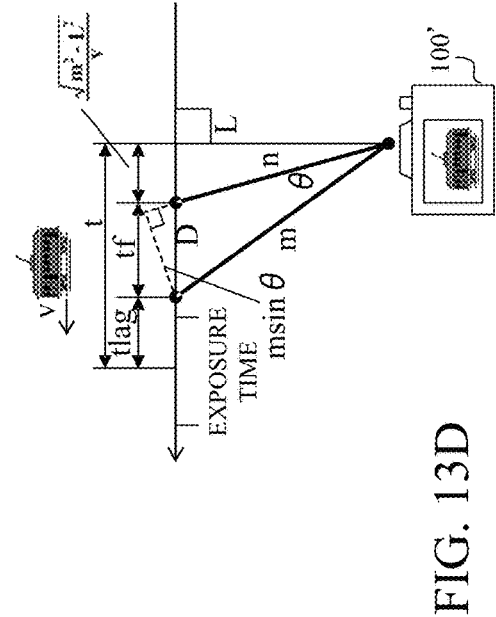
Figure 13D:
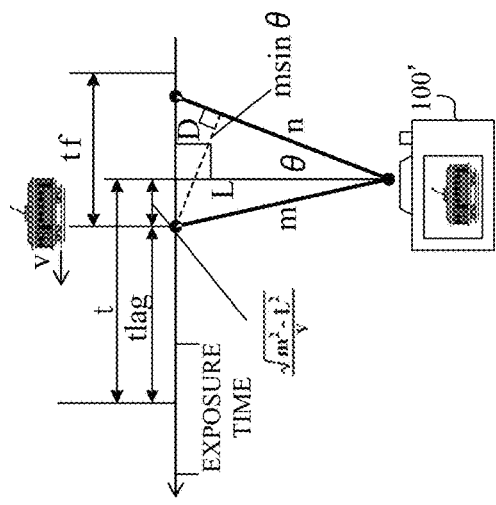

FIG. 13C shows a case where m≤n in expression (8), and FIG. 13D shows a case where m>n in expression (8).

The shortest distance L expressed by expression (4) can be calculated, in all of FIGS. 13A to 13D, from a similarity relation (m sin θ:D=L:n) between a triangle having sides m sin θ and D and a triangle having sides L and n. The motion distance D expressed by expression (6) can be calculated, in all of FIGS. 13A to 13D, by a Pythagorean theorem in the triangle having the sides m sin θ and D.

In FIGS. 13A to 13C, the motion distance D can be calculated from:

$$D^2 = (m \sin \theta)^2 + (n - m \cos \theta)^2.$$

In FIG. 13D, the motion distance D can be calculated from:

$$D^2 = (m \sin \theta)^2 + (m \cos \theta - n)^2.$$

At step S604, the object angular velocity setter 603 sets the in-exposure relative object angular velocity ω by using expression (2) described in Embodiment 1 with a weight W of 1.

This embodiment can calculate the in-exposure relative object angular velocity ω by acquiring the object distance at arbitrary two time points and the change amount Δθ of the panning angle θ therebetween. Thus, this embodiment enables performing the follow shot assist allowing a good follow shot with reduced object image blur even when the angular velocity of the object measured from the camera 100' changes.

Embodiment 3

Next, description will be made of a camera as an image capturing apparatus that is a third embodiment (Embodiment 3) of the present invention. A configuration of the camera of this embodiment is common to that of the camera 100 of Embodiment 1, and therefore components of the camera in this embodiment are denoted by the same reference numerals as those in Embodiment 1.

Embodiments 1 and 2 described the case where the in-exposure relative object angular velocity is calculated only once before the exposure and the follow shot assist is performed depending on its calculation result. In this case, although a short exposure time causes no problem, a long exposure time may make it impossible to perform a good follow shot because of a change of the relative object angular velocity during that long exposure time. Thus, this embodiment sequentially calculates (repetitively updates) the in-exposure relative object angular velocity during the exposure time and controls the shift drive of the shift lens 104 depending on a newest calculation result, which makes it possible to perform a good follow shot even when the exposure time is long.

Figure 14:
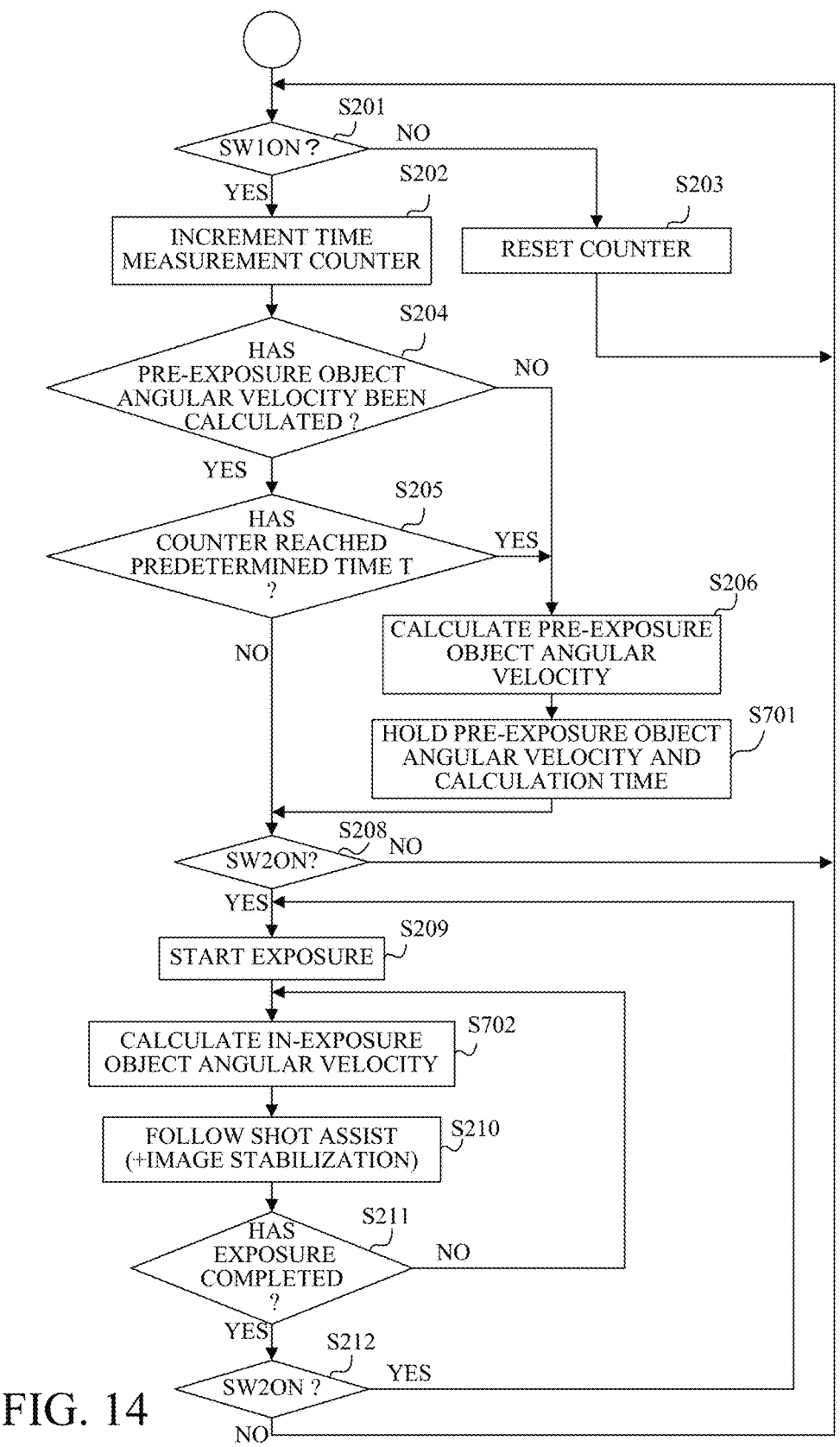
FIG. 14 is a flowchart showing a follow shot assist process in the camera of Embodiment 3.

FIG. 14 is a flowchart showing a follow shot assist process performed by the camera microcomputer 130 in the follow shot assist mode in this embodiment. The camera microcomputer 130 executes this process according to a follow shot assist control program as a computer program. In FIG. 14, steps common to those in the flowchart of FIG. 2 in Embodiment 1 are illustrated with the same step numbers as those in FIG. 2, and description thereof is omitted.

In this embodiment, the camera microcomputer 130 causes at step S206, as in Embodiment 1, the object angular velocity calculator 134 to calculate the pre-exposure relative object angular velocity. After this process (first process), the camera microcomputer 130 causes, at next step S701, the object angular velocity setter 603 to hold the pre-exposure relative object angular velocity calculated at step S206 and its calculation time as a pre-exposure angular velocity history. When the in-exposure relative object angular velocity is calculated by the method described in Embodiment 2, the camera microcomputer 130 causes the object angular velocity setter 603 to hold, in addition to the calculated pre-exposure relative object angular velocity and the calculation time, the object distance at the calculation time and the change amount of the panning angle θ from the previous calculation time of the pre-exposure relative object angular velocity. At step 702 during the exposure time (during image capturing for recording) after the start of the exposure at step S209, the camera microcomputer 130 causes the object angular velocity setter 603 to calculate (set) a new in-exposure relative object angular velocity. This process corresponds to a second process. The camera microcomputer 130 repeats this process at step S702 until the exposure is completed at step S211 to repetitively update the in-exposure relative object angular velocity. Then, the camera microcomputer 130 causes at step S210, at each time when the in-exposure relative object angular velocity is updated at step S702, the follow shot controller 132 to control the shift drive of the shift lens 104 depending on the updated in-exposure relative object angular velocity.

This embodiment repeats the calculation of the in-exposure relative object angular velocity also during the exposure time and performs the follow shot assist based on the newly calculated in-exposure relative object angular velocity. That is, this embodiment increases the number of the in-exposure relative object angular velocities to be calculated (that is, increases the number of times to calculate the prediction information) when the exposure time is longer than a predetermined period. Therefore, this embodiment enables performing the follow shot assist allowing a good follow shot with reduced object image blur even when the exposure time is long.

Embodiment 4

Figure 15:
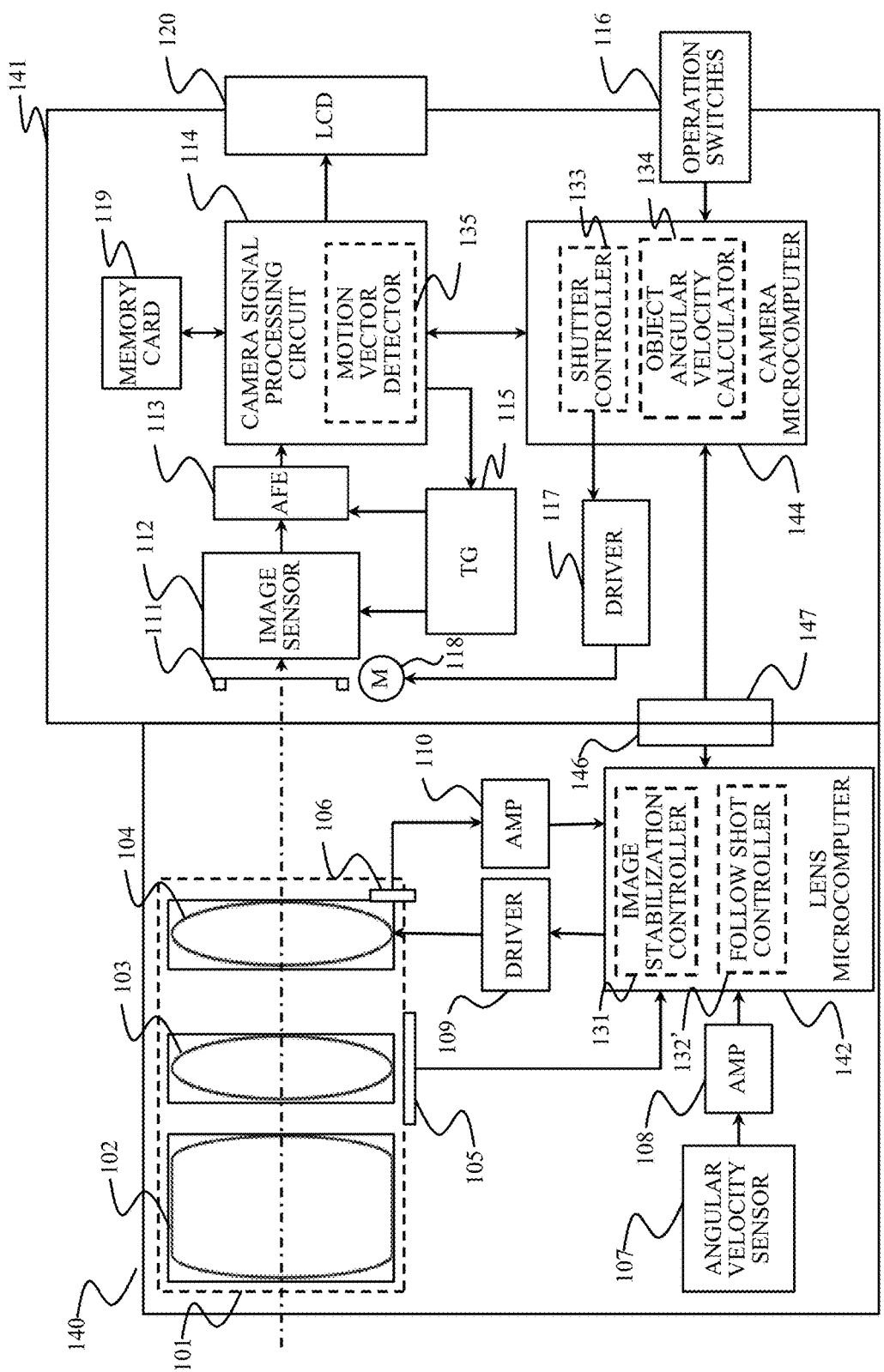
FIG. 15 is a block diagram showing a configuration of a lens-interchangeable camera system that is Embodiment 4 of the present invention.

Next, with reference to FIG. 15, description will be made of a lens-interchangeable camera system as an image capturing apparatus, which is a fourth embodiment (Embodiment 4) of the present invention. An interchangeable lens 140 is detachably attachable to a lens-interchangeable camera 141. In FIG. 15, components common to those of the camera 100 shown in FIG. 3 in Embodiment 1 are denoted by the same reference numerals as those in Embodiment 1, and description thereof is omitted.

In this embodiment, a camera microcomputer 144 included in the camera 141 and a lens microcomputer 142 included in the interchangeable lens 140 share the processes performed by the camera microcomputer 130 in Embodiment 1. The lens microcomputer 142 and the camera microcomputer 144 perform serial communication for sending and receiving information through a mount contact 146 provided to the interchangeable lens 140 and a mount contact 147 provided to the camera 141. The camera microcomputer 144 includes the shutter controller 133 and the t angular velocity calculator 134. The lens microcomputer 142 includes the image stabilization controller 131 and a follow shot controller 132'. The follow shot controller 132' is different from the follow shot controller 132 in Embodiment 1 in receiving information through the serial communication from the camera microcomputer 144 (object angular velocity calculator 134). In this embodiment, the lens microcomputer 142 included in the interchangeable lens 140 corresponds to a controller, and the object angular velocity calculator 134 as a calculator is included in the camera microcomputer 144.

Figure 16:
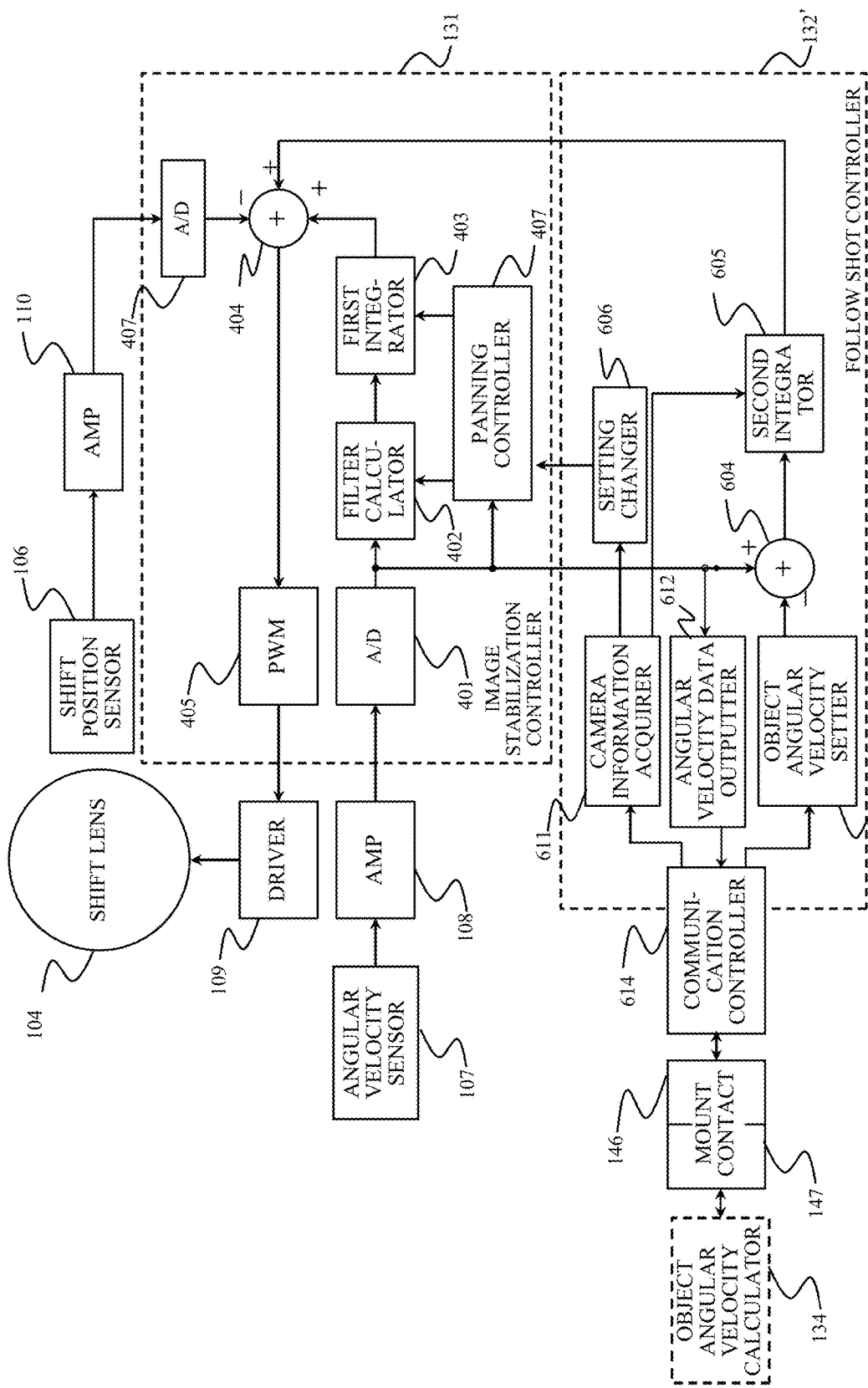
FIG. 16 is a block diagram showing a configuration of a follow shot assist control system in an interchangeable lens of Embodiment 4.

FIG. 16 shows a configuration of a shift drive control system provided to the interchangeable lens 140; the system performs a shift drive control of the shift lens 104 in the follow shot assist mode in this embodiment. In FIG. 16, components common to those shown in FIG. 6 in Embodiment 1 are denoted by the same reference numerals as those in Embodiment 1, and description thereof is omitted.

The follow shot controller 132' includes a camera information acquirer 611, an angular velocity data outputter 612, an object angular velocity setter 613, the second adder 604 and the second integrator 605.

The camera information acquirer 611 acquires, from the camera microcomputer 144 via a communication controller 614, the follow shot setting information and release information described in Embodiment 1. The angular velocity data outputter 612 samples the angular velocity data described in Embodiment 1 at the predetermined times and sends the sampled angular velocity data to the object angular velocity calculator 134 in the camera microcomputer 144 via the communication controller 614.

The object angular velocity setter 613 receives the information sent from the object angular velocity calculator 134 in the camera microcomputer 144 via the communication controller 614. The sent information includes a set (or multiple sets) of the pre-exposure relative object angular velocity calculated by the object angular velocity calculator 134 before the exposure and a delay time from the calculation time (acquisition time) of the pre-exposure relative object angular velocity to a communication time at which this information is sent to the object angular velocity setter 613. The object angular velocity setter 613 converts the received delay time into a lens-side calculation time as an internal time of the lens microcomputer 142 and holds (accumulates) information including multiple sets of the calculation time and the received pre-exposure relative object angular velocity as a pre-exposure angular velocity history. Then, the object angular velocity setter 613 sets (estimates) an in-exposure relative object angular velocity by using the pre-exposure angular velocity history.

Figure 17:
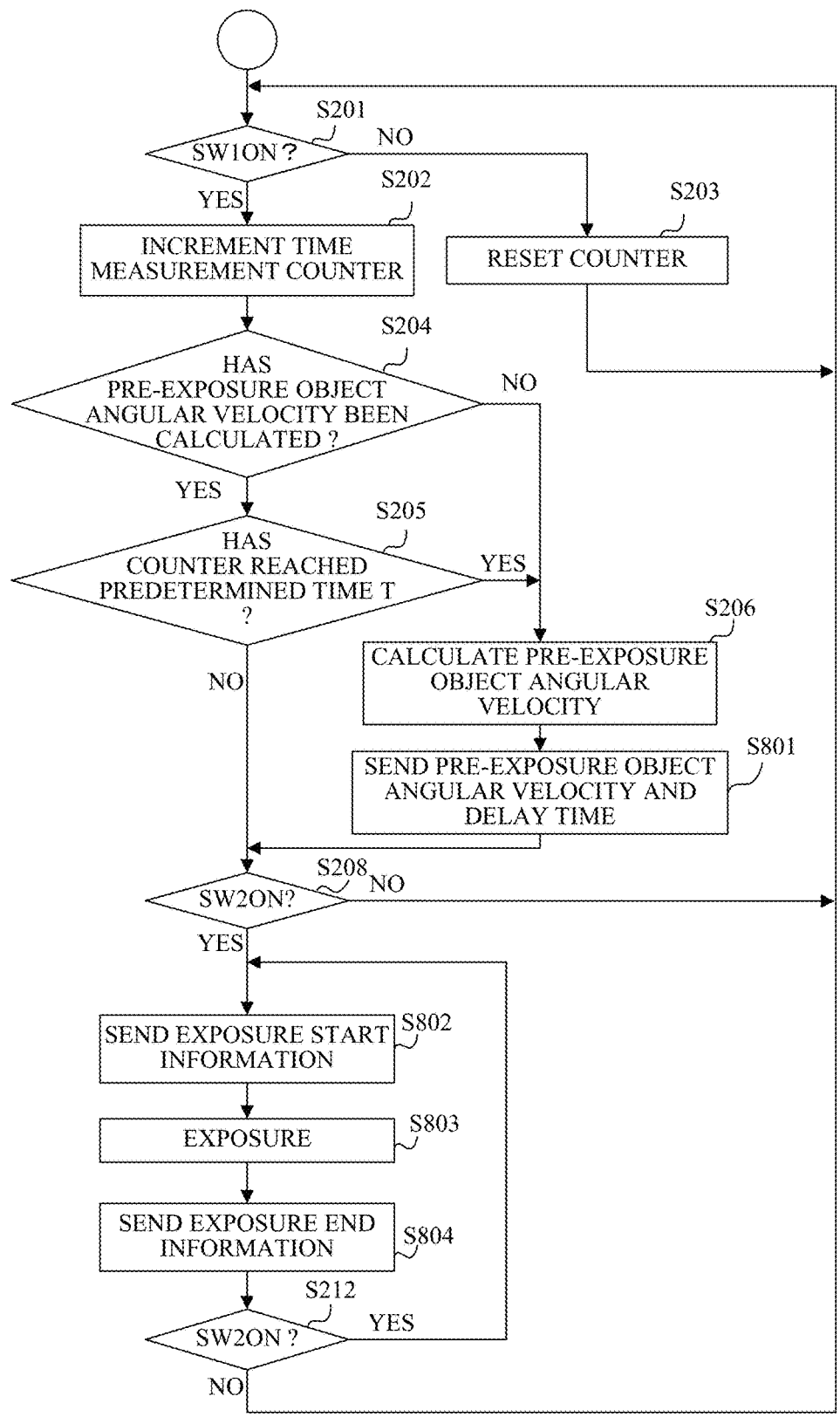
FIG. 17 is a flowchart showing a camera-side follow shot assist process in Embodiment 4.

FIG. 17 is a flowchart showing a follow shot assist process performed by the camera microcomputer 144 in the follow shot assist mode. The camera microcomputer 144 executes this process according to a camera-side follow shot assist control program that is a computer program. In FIG. 17, steps common to those in the flowchart of FIG. 2 in Embodiment 1 are illustrated with the same step numbers as those in FIG. 2, and description thereof is omitted.

At step S206, the camera microcomputer 144 causes the object angular velocity calculator 134 to calculate the pre-exposure relative object angular velocity. After this step (first step), the camera microcomputer 144 sends at step S801, to the lens microcomputer 142, the information including the sets of the calculated pre-exposure relative object angular velocity and the delay time from the calculation time thereof to a current time point that is the communication time.

Thereafter, if the SW2ON is performed at step S208, the camera microcomputer 144 sends at step S802 exposure start time information to the lens microcomputer 142 and performs an exposure of the image sensor 112. Furthermore, after the exposure is completed, the camera microcomputer 144 sends at step S803 exposure end time information to the lens microcomputer 142. Then, the camera microcomputer 144 proceeds to step S212.

Figure 18:
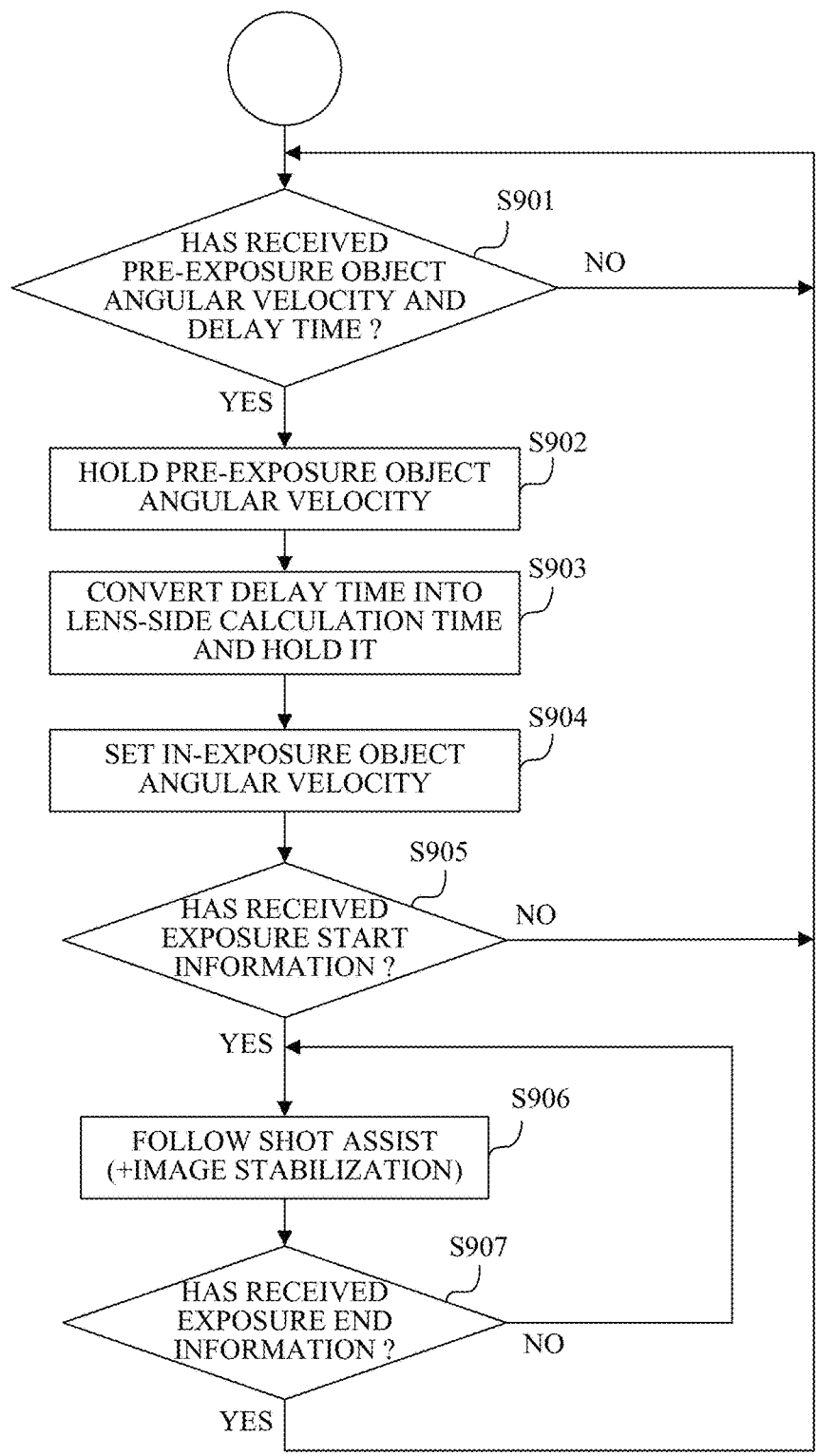
FIG. 18 is a flowchart showing a lens-side follow shot assist process in Embodiment 4.

FIG. 18 is a flowchart showing a follow shot assist process performed by the lens microcomputer 142 in the follow shot assist mode. The lens microcomputer 142 executes this process according to a lens-side follow shot assist control program that is a computer program.

At step S901, the lens microcomputer 142 determines whether or not having received the information including the sets of the pre-exposure relative object angular velocity and the delay time from the camera microcomputer 144. If having received the information, the lens microcomputer 142 proceeds to step S902, and otherwise repeats the process at this step.

At step S902, the lens microcomputer 142 holds the received pre-exposure relative object angular velocities.

Next, at step S903, the lens microcomputer 142 calculates, from the delay time received at step S901, the lens-side calculation time of the pre-exposure relative object angular velocity and holds the information including the sets of the calculated calculation time and the pre-exposure relative object angular velocity as the pre-exposure angular velocity history.

At step S904, the lens microcomputer 142 sets a relative object angular velocity (in-exposure relative object angular velocity) at a midpoint of the exposure time. The lens microcomputer 142 performs this setting by the angular velocity setting process (second process) described in Embodiment 1 by using the flowchart shown in FIG. 1. Alternatively, the lens microcomputer 142 may perform the above setting by receiving the information on the object distance and the change amount of the panning angle θ from camera microcomputer 144 and performing the angular velocity setting process described in Embodiment 2 by using FIG. 12.

Next at step S905, the lens microcomputer 142 determines whether or not having received the exposure start time information from the camera microcomputer 144. If having received the exposure start time information, the lens microcomputer 142 proceeds to step S906, and otherwise returns to step S901.

At step S906, the lens microcomputer 142 controls the shift drive of the shift lens 104, through the follow shot controller 132, so as to correct the displacement amount of the object image on the image plane, as at step S210 shown in FIG. 2 in Embodiment 1. Simultaneously, if the determination that the fast panning is being performed is made as at step S502 shown in FIG. 5 in Embodiment 1, the lens microcomputer 142 controls the shift drive of the shift lens 104 so as to correct the image blur due to the camera shake through the image stabilization controller 131.

Then, at step S907, the lens microcomputer 142 determines whether or not having received the exposure end time information from the camera microcomputer 144. If having received the exposure end time information, the lens microcomputer 142 returns to step S901, and otherwise returns to step S906 to continue the follow shot assist process.

This embodiment allows the lens-interchangeable camera system to perform a follow shot assist similar to that described in Embodiment 1 or 2.

In a case of allowing the interchangeable lens 140 to perform a follow shot assist similar to that described in Embodiment 3, the lens microcomputer 142 performs the process at step S904 in FIG. 18 before step S906 and returns to step S904 if not having received the exposure end time information at step S907.

This embodiment described the case where the camera microcomputer 144 sends to the lens microcomputer 142 the delay time from the calculation time of the pre-exposure relative object angular velocity to the communication time thereof and the lens microcomputer 142 calculates the lens-side calculation time from the delay time. However, a configuration may be employed which matches the internal time of the lens microcomputer 142 and that of the camera microcomputer 144 beforehand and the camera microcomputer 144 sends to the lens microcomputer 142 the pre-exposure relative object angular velocity and the calculation time thereof.

Embodiment 5

Next, description will be made of a lens-interchangeable camera system as an image capturing apparatus, which is a fifth embodiment (Embodiment 5) of the present invention. Components common to those of the interchangeable lens 140 and the camera 141 shown in FIGS. 15 and 16 in Embodiment 4 are denoted by the same reference numerals as those in Embodiment 4, and description thereof is omitted.

Although Embodiment 4 described the case where the lens microcomputer 142 calculates the in-exposure relative object angular velocity, Embodiment 5 will describe a case where the camera microcomputer 144 calculates the in-exposure relative object angular velocity. Specifically, the camera microcomputer 144 produces a list of in-exposure relative object angular velocities in which a time lag to a start time of the exposure into consideration and whose number corresponds to a number of shift drive times of the shift lens 104. The camera microcomputer 144 sends the list to the lens microcomputer 142.

Figure 19:
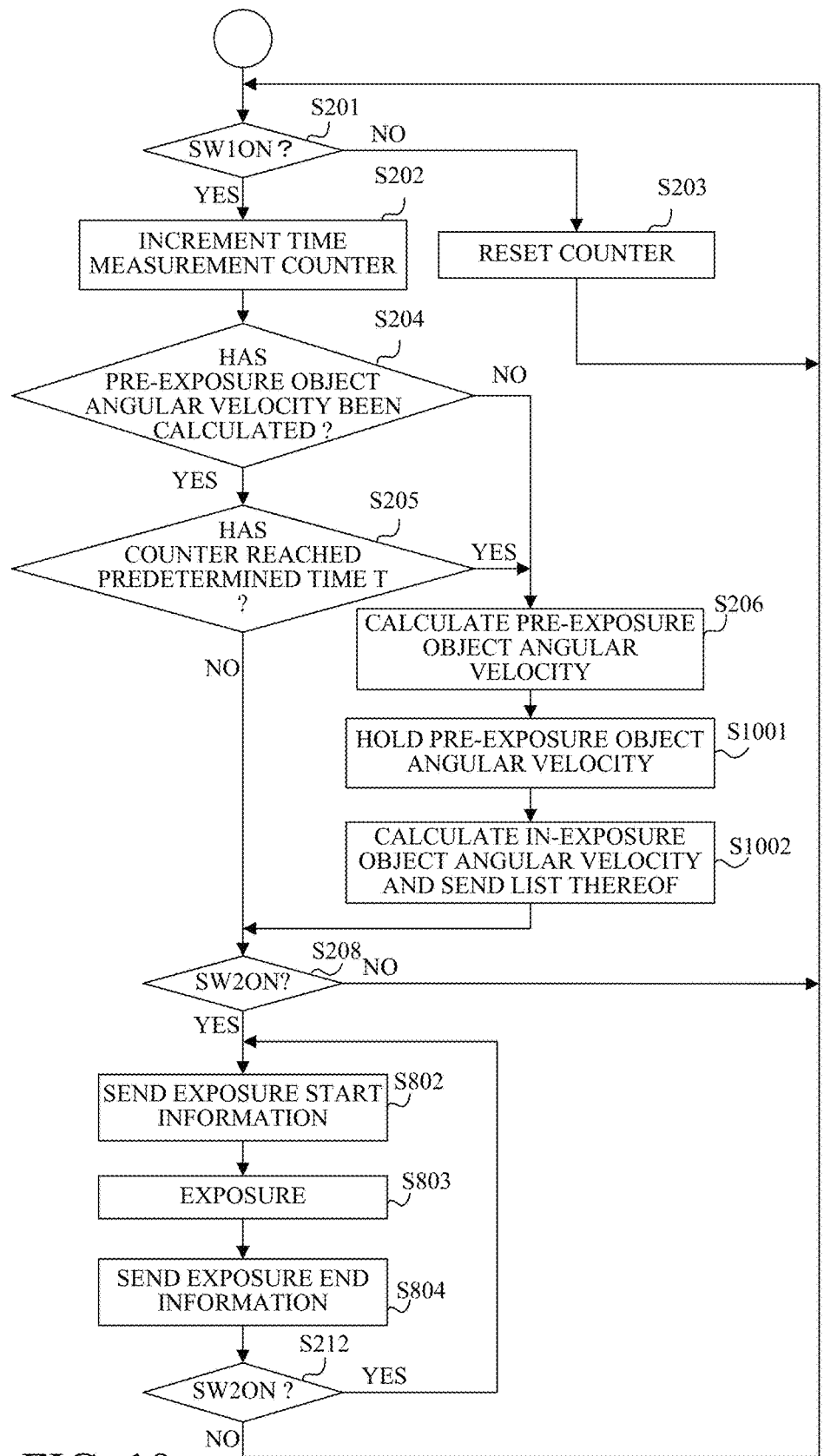
FIG. 19 is a flowchart showing a camera-side follow shot assist process in a lens-interchangeable camera system that is Embodiment 5 of the present invention.

FIG. 19 is a flowchart showing a follow shot assist process performed by the camera microcomputer 144 in the follow shot assist mode in this embodiment. The camera microcomputer 144 executes this process according to a camera-side follow shot assist control program that is a computer program. In FIG. 19, steps common to those in the flowchart of FIG. 17 in Embodiment 4 are illustrated with the same step numbers as those in FIG. 17, and description thereof is omitted.

At step S1001, the camera microcomputer 144 holds the pre-exposure relative object angular velocity calculated at step S206 (first process).

Next at step S1002, the camera microcomputer 144 performs the same process (second process) as that performed at step S207 described in Embodiment 1 by using FIG. 2 to calculate the in-exposure relative object angular velocity. However, at this step, the camera microcomputer 144 produces the list including multiple in-exposure relative object angular velocities for predetermined periodic times of the shift drive of the shift lens 104 and sends this list to the lens microcomputer 142.

For example, in a case where the exposure time is 1/100 seconds and the period of the shift drive of the shift lens 104 is 1 kHz, the shift lens 104 is driven 10 times within the exposure time. Thus, the camera microcomputer 144 calculates the in-exposure relative object angular velocity for each of the 10 shift drive times and sends the list including the 10 calculated in-exposure relative object angular velocities to the lens microcomputer 142.

In this embodiment, the object angular velocity calculator 134 in the camera microcomputer 144 calculates the in-exposure relative object angular velocities and produces the list thereof. That is, the camera microcomputer 144 corresponds to a calculator, and the lens microcomputer 142 corresponds to a controller.

Figure 20:
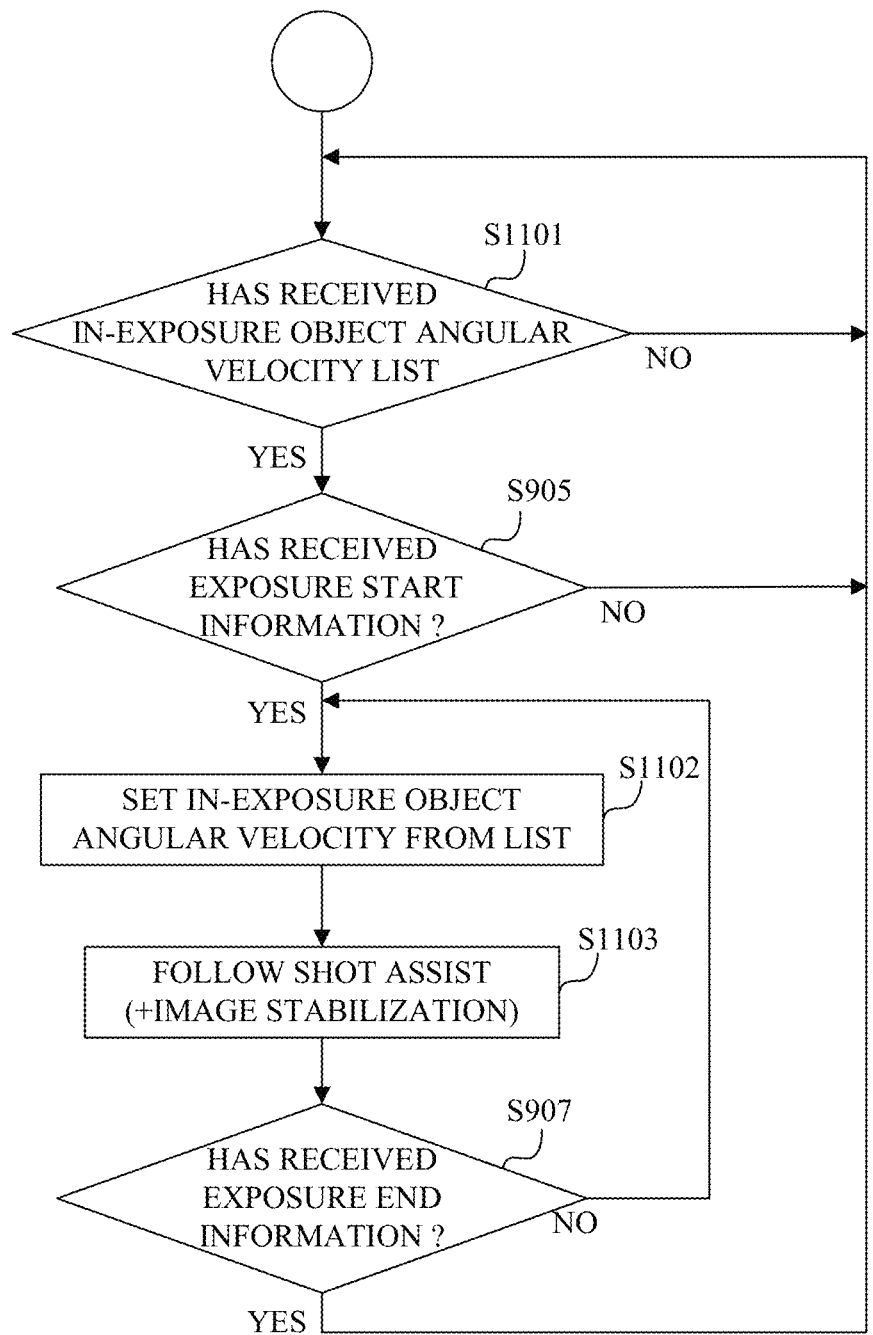
FIG. 20 is a flowchart showing an interchangeable lens-side follow shot assist process in Embodiment 5.

FIG. 20 is a flowchart showing a follow shot assist process performed by the lens microcomputer 142 in the follow shot assist mode. The lens microcomputer 142 executes this process according to a follow shot assist control program that is a computer program. In FIG. 20, steps common to those in the flowchart of FIG. 18 in Embodiment 4 are illustrated with the same step numbers as those in FIG. 18, and description thereof is omitted.

At step S1101, the lens microcomputer 142 determines whether or not having received the list of the in-exposure relative object angular velocities from the camera microcomputer 144. If having received the list, the lens microcomputer 142 proceeds to step S905, and otherwise repeats the process at this step.

The lens microcomputer 142 having received the exposure start time information from the camera microcomputer 144 at step S905 reads out at step S1102, from the list received at step S1101, the in-exposure relative object angular velocities for the respective shift drive times of the shift lens 104. Then, the lens microcomputer 142 sets the in-exposure relative object angular velocities to be used for the respective shift drive times, in the order from the earliest shift drive time.

Next at step S1103, the lens microcomputer 142 causes the follow shot controller 132' to control the shift drive of the shift lens 104 depending on the in-exposure relative object angular velocity set at step S1102. In the control of the shift drive, the lens microcomputer 142 changes the in-exposure relative object angular velocity used at the respective shift drive times of shift lens 104, in the order set at step S1102. That is, the in-exposure relative object angular velocity is sequentially updated.

Furthermore, in this control of the shift drive, if a determination that the fast panning is being performed is made as at step S502 shown in FIG. 5 in Embodiment 1, the lens microcomputer 142 performs the shift drive of the shift lens 104 in order to correct the image blur due to the camera shake through the image stabilization controller 131. The lens microcomputer 142 repeats the above processes until the exposure is completed (step S907). Thereby, this embodiment can respond to the change of the object angular velocity during the exposure.

Figure 21:
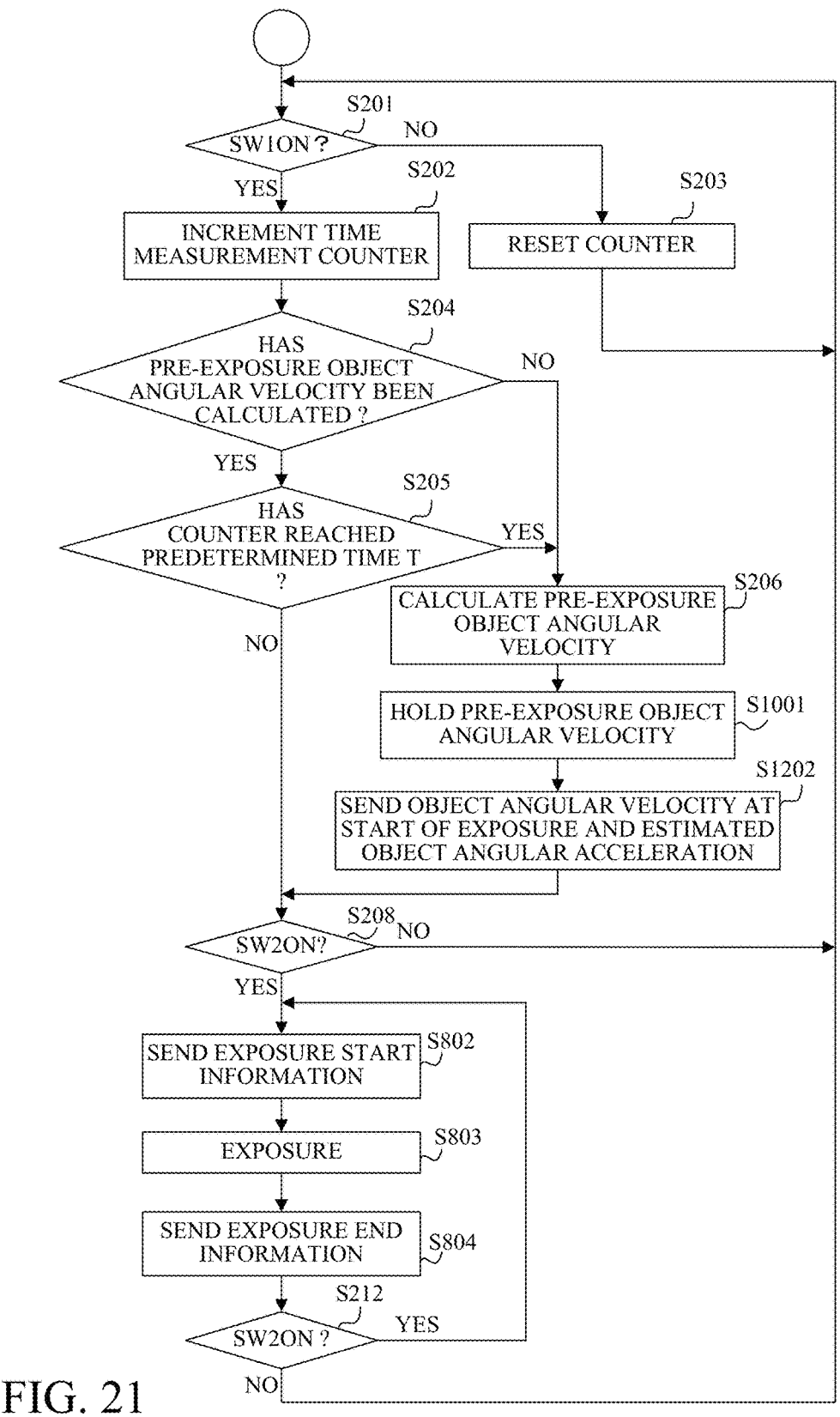
FIG. 21 is a flowchart showing a camera-side follow shot assist process in a modified example of Embodiment 5.

Moreover, although the camera and lens microcomputers 144 and 142 sends and receives the list of the in-exposure relative object angular velocities as data in this embodiment, sending and receiving a relative object angular velocity and a relative object angular acceleration at the start time of the exposure also enables responding to the change of the in-exposure relative object angular velocity. FIG. 21 is a flowchart showing a follow shot assist process, as a modified example of this embodiment, performed by the camera microcomputer 144 in the follow shot assist mode. In FIG. 21, steps common to those in the flowchart of FIG. 19 are illustrated with the same step numbers as those in FIG. 19, and description thereof is omitted.

The camera microcomputer 144 having held at step 1001 the pre-exposure relative object angular velocity calculated at step S206 calculates at step S1202 the multiple in-exposure relative object angular velocities as at step S1002 in FIG. 19. Then, the camera microcomputer 144 calculates, by using the multiple in-exposure relative object angular velocities, the relative object angular velocity at the start time of the exposure and a relative object angular acceleration that is an estimated acceleration as prediction information of the motion of the object relative to the camera. The camera microcomputer 144 sends information including the relative object angular velocity at the start time of the exposure and the relative object angular acceleration to the camera microcomputer 144. Thereafter, the camera microcomputer 144 proceeds to step S208 and subsequent steps.

Figure 22:
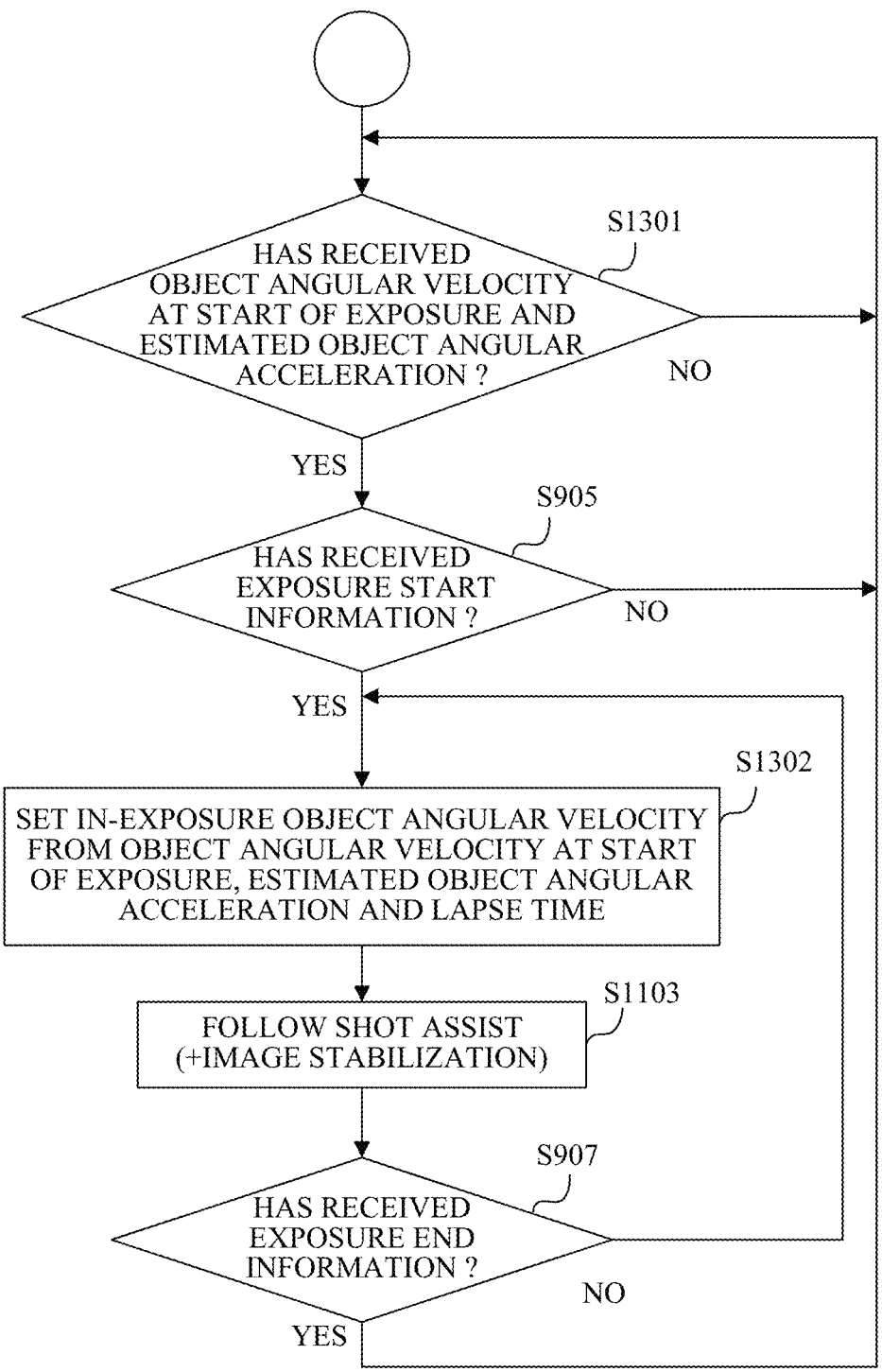
FIG. 22 is a flowchart showing a lens-side follow shot assist process in the modified example of Embodiment 5.

FIG. 22 is a flowchart showing a follow shot assist process performed by the lens microcomputer 142 in the follow shot assist mode in this modified example. In FIG. 22, steps common to those in the flowchart of FIG. 20 are illustrated with the same step numbers as those in FIG. 20, and description thereof is omitted.

At step S1301, the lens microcomputer 142 determines whether or not having received the information including the relative object angular velocity at the start time of the exposure and the relative object angular acceleration from the camera microcomputer 144. If having received the information, the lens microcomputer 142 proceeds to step S905, and otherwise repeats the process at this step.

The lens microcomputer 142 determining at step S905 that the exposure having been started proceeds to step S1302. At step S1302, the camera microcomputer 144 sets, by using the received relative object angular velocity at the start time of the exposure, the received relative object angular acceleration and a lapse time after the start time of the exposure, the in-exposure relative object angular velocities for the respective predetermined periodic times (correction times) of the shift drive of the shift lens 104.

Then, at step S1103, the lens microcomputer 142 causes, at the respective correction times, the follow shot controller 132' to control the shift drive of the shift lens 104 depending on the in-exposure relative object angular velocities set at step S1302 for the respective correction times. Thus, the in-exposure relative object angular velocity is sequentially updated.

In this control of the shift drive, if a determination that the fast panning is being performed is made as at step S502 shown in FIG. 5 in Embodiment 1, the lens microcomputer 142 performs the shift drive of the shift lens 104 in order to correct the image blur due to the camera shake through the image stabilization controller 131. The lens microcomputer 142 repeats the above processes until the exposure is completed at step S907. Thereby, this embodiment can respond to the change of the object angular velocity during the exposure.

This embodiment allows the lens-interchangeable camera system to perform a good follow shot with reduced object image blur even when the relative object angular velocity changes during the exposure time.

Although each of the above embodiments described the case of performing the follow shot assist and the image blur correction against the camera shake by shifting the shift lens 104 constituting part of the image capturing lens unit 101, the follow shot assist and the image blur correction may be performed by shifting the entire image capturing lens unit or by shifting the image sensor 112 as an optical element (shiftable element).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-41436, filed Mar. 3, 2015, and 2015-250675, filed Dec. 22, 2015 which are hereby incorporated by reference herein in their entirety.

What is claimed is:

1. An image capturing apparatus configured to perform image capturing of an object, the apparatus comprising:
at least one processor or at least one circuit for performing the functions of:
a controller configured to control an optical element, when a motion of the image capturing apparatus follows a motion of a main object, by using (a) first motion information obtained from a first detector to detect the motion of the image capturing apparatus and (b) second motion information obtained from a second detector to detect a motion of an image of the main object; and
a calculator configured to calculate prediction information on a velocity of the image of the main object during an exposure time for the image capturing of the main object, which includes a change of the velocity from that before the exposure time, by using the second motion information detected at different timings before the exposure time,
wherein the controller is configured to use the prediction information to control the optical element during the exposure time in a follow shot mode to acquire a captured image in which the main object is still within the captured image and a background flows, and
wherein the controller is configured not to use the prediction information to control the optical element during the exposure time in capturing mode that is not the follow shot mode.

2. An image capturing apparatus according to claim 1, wherein the calculator is configured to calculate the prediction information by using:
angular velocity information of the image of the main object before the exposure time;
angular acceleration information of the image of the main object before the exposure time;
a calculation time at which the angular velocity information and the angular acceleration information are calculated; and
a start time at which the exposure time is started.

3. An image capturing apparatus according to claim 1, wherein the calculator is configured to calculate the prediction information by using a change of an angular acceleration depending on a position of the main object relative to a position of the image capturing apparatus.

4. An image capturing apparatus according claim 3, wherein the calculator is configured to calculate the position of the main object relative to the position of the image capturing apparatus, by using distance information based on a distance from the image capturing apparatus to the main object.

5. An image capturing, apparatus according to claim 1, wherein the calculator is configured to increase a number of times to calculate the prediction information used to control the optical element when the exposure time is longer than a predetermined time.

6. An image capturing apparatus according to claim 1, wherein the controller is configured to use (a) the prediction information and (b) the first motion information obtained during the exposure time to control the optical element during the exposure time.

7. A method of controlling an image capturing apparatus configured to perform image capturing of an object, the method comprising:
controlling an optical element, when a motion of the image capturing apparatus follows a motion of a main object, by using (a) first motion information obtained from a first detector to detect the motion of the image capturing apparatus and (b) second motion information obtained from a second detector to detect a motion of an image of the main object; and
calculating prediction information on a velocity of the image of the object during an exposure time for the image capturing of the main object, which includes a change of the velocity from that before the exposure time, by using the second motion information detected at different timings before the exposure time,
wherein the method controls the optical element during the exposure time, by using the prediction information in a follow shot mode to acquire a captured image in which the main object is still within the captured image and a background flows, and
wherein the method controls the optical element during the exposure time, without using the prediction information in an image capturing mode that is not the follow shot mode.

8. A method according to claim 7, wherein the method controls the optical element during the exposure time, by using (a) the prediction information and (b) the first motion information obtained during the exposure time.

9. A non-transitory computer-readable storage medium storing a control program as a computer program to cause a computer of an image capturing apparatus to operate, the image capturing apparatus being configured to perform image capturing of an object, the control program causing the computer to:
control an optical element, when a motion of the image capturing apparatus follows a motion of a main object, by using (a) first motion information obtained from a first detector to detect the motion of the image capturing apparatus and (b) second motion information obtained from a second detector to detect a motion of an image of the main object; and
calculate prediction information velocity of the image of the main object during an exposure time for the image capturing of the main object, which includes a change of the velocity from that before the exposure time, by using the second motion information detected at different timings before the exposure time,
wherein the control program causes the computer to control the optical element during the exposure time, by using the prediction information in a follow shot mode to acquire a captured image in which the main object is within the captured image and a background flows, and
wherein the control program causes the computer to control the optical element during the exposure time, without using the prediction information in an image capturing mode that is not the follow shot mode.

10. A non-transitory computer-readable storage medium according to claim 9, wherein the control program causes the computer to control the optical element during the exposure time, by using (a) the prediction information and (b) the first motion information obtained during the exposure time.

11. An image capturing apparatus according to claim 1, wherein the controller is configured to calculate the prediction information by using a length of time from a time point at which the second motion information is last detected before the exposure time to a midpoint of the exposure time.

12. An image capturing apparatus configured to perform image capturing of an object, the apparatus comprising:
at least one processor or at least one circuit for performing the functions of:
a controller configured to control an optical element, by using (a) first motion information obtained from a first detector to detect a motion of the image capturing apparatus and (b) second motion information obtained from a second detector to detect a motion of an image of a main object; and
a calculator configured to calculate prediction information on a motion of the image of the main object during an exposure time for the image capturing the main object, by using the second motion information detected before the exposure time,
wherein the controller is configured to use the prediction information to control the optical element during the exposure time in a follow shot mode to acquire a captured image in which the main object is still within the captured image and a background flows,
wherein the controller is configured not to use the prediction information to control the optical element during the exposure time in an image capturing mode that is not the follow shot mode, and
wherein the second motion information includes information about acceleration which is calculated by using the information about velocity detected at different timings before the exposure time.

13. An image capturing apparatus according to claim 12, wherein the calculator is configured to calculate the prediction information by using:
angular velocity information of the image of the main object before the exposure time;
angular acceleration information of the image of the main object before the exposure time;
a calculation time at which the angular velocity information and the angular acceleration information are calculated; and
a start time at which the exposure time is started.

14. An image capturing apparatus according to claim 12, wherein the calculator is configured to calculate the prediction information by using a change of an angular acceleration depending on a position of the main object relative to a position of the image capturing apparatus.

15. An image capturing apparatus according to claim 14, wherein the calculator is configured to calculate the position of the main object relative to the position of the image capturing apparatus, by using distance information based on a distance from the image capturing apparatus to the main object.

16. An image capturing apparatus according to clam 12, wherein the calculator is configured to increase a number of times to calculate the prediction information used to control the optical element when the exposure time is longer than a predetermined time.

17. An image capturing apparatus according to claim 12, wherein the controller configured to use (a) the prediction information and (b) the first motion information obtained during the exposure time to control the optical element during the exposure time.

18. An image capturing apparatus according to claim 12, wherein the controller is configured to calculate the prediction information by using a length of time from a time point at which the second motion information is last detected before the exposure time to a midpoint of the exposure time.

19. A method of controlling an image capturing apparatus configured to perform image capturing of an object, the method comprising:
controlling an optical element, by using (a) first motion information obtained from a first detector to detect a motion of the image capturing apparatus and (b) second motion information obtained from a second detector to detect a motion of an image of a main object; and
calculating prediction information on the motion of the image of the main object during an exposure time for the image capturing of the main object, by using the second motion information detected before the exposure time,
wherein the method controls the optical element during the exposure time, by using the prediction information in a follow shot mode to acquire a captured image in which the main object is still within the captured image and a background flows,
wherein the method controls the optical element during the exposure time, without using the prediction information in an image capturing mode that is not the follow shot mode, and
wherein the second motion information includes information about acceleration which is calculated by using the information about velocity detected at different timings before the exposure time.

20. A non-transitory computer-readable storage medium storing a control program as a computer program to cause a computer of an image capturing apparatus to operate, the image capturing apparatus being configured to perform image capturing of an object, the control program causing the computer to:
control an optical element, by using (a) first motion information obtained from a first detector to detect a motion of the image capturing apparatus and (b) second motion information obtained from a second detector to detect a motion of an image of a main object; and
calculate prediction information on the motion of the image of the main object during an exposure time for the image capturing of the main object, by using the second motion information detected before the exposure time,
wherein the control program causes the computer to control the optical element during the exposure time, by using the prediction information in a follow shot mode to acquire a captured image in which the main object is still within the captured image and a background flows,
wherein the control program causes the computer to control the optical element during the exposure time, without using the prediction information in an image capturing mode that is not the follow shot mode, and
wherein the second motion information includes information about acceleration which is calculated by using the information about velocity detected at different timings before the exposure time.

21. An image capturing apparatus according to claim 12, wherein the information about velocity is angular velocity information, and the information about acceleration is angular acceleration information.

22. A method according to claim 19, wherein the information about velocity is angular velocity information, and the information about acceleration is angular acceleration information.

23. A non-transitory computer-readable storage medium according to claim 20, wherein the information about velocity is angular velocity information, and the information about acceleration is angular acceleration information.

24. An image capturing apparatus configured to perform image capturing of an object, the apparatus comprising:
at least one processor or at least one circuit performing the functions of:
a controller configured to control an optical element, when a motion of the image capturing apparatus follows a motion of the object, by using (a) first motion information obtained from a first detector to detect the motion of the image capturing apparatus and (b) second motion information obtained from a second detector to detect a motion of an image of the object; and
a calculator configured to calculate prediction information on a velocity of the image of the object during an exposure time for the image capturing of the object, which includes a change of the velocity from that before the exposure time, by using the second motion information detected at different timings before the exposure time,
wherein the prediction information includes a change of a motion from the motion of the image capturing apparatus before the exposure time, and
wherein the controller is configured to use the prediction information to control the optical element during the exposure time.

25. An image capturing apparatus configured to perform image capturing of an object, the apparatus comprising:
at least one processor or at least one circuit for performing the functions of:
a controller configured to control an optical element, by using (a) first motion information obtained from a first detector to detect a motion of the image capturing apparatus and (b) second motion information obtained from a second detector to detect a motion of an image of the object; and
a calculator configured to calculate prediction information on a motion of the image of the object during an exposure time for the image capturing the object, by using the first motion information detected during the exposure time and the second motion information detected at different timings before the exposure time,
wherein the controller is configured to use the prediction information to control the optical element during the exposure time,
wherein the first motion information includes information about velocity detected during the exposure time, and
wherein the second motion information includes information about acceleration which is calculated by using the information about velocity detected at different timings multiple times before the exposure time.

26. A method of controlling an image capturing apparatus configured to perform image capturing of an object, the method comprising:

controlling an optical element, when a motion of the image capturing apparatus follows a motion of the object, by using (a) first motion information obtained from a first detector to detect the motion of the image capturing apparatus and (b) second motion information obtained from a second detector to detect a motion of an image of the object; and calculating prediction information on a velocity of the image of the object during an exposure time for the image capturing of the object, which includes change of the velocity from that before the exposure time, by using the second motion information detected at different timings before the exposure time, wherein the prediction information includes a change of motion from the motion of the image capturing apparatus before the exposure time, and wherein the method controls the optical element during the exposure time, by using the prediction information.

27. A non-transitory computer-readable storage medium storing a control program as a computer program to cause a computer of an image capturing apparatus to operate, the image capturing apparatus being configured to perform image capturing of an object, the control program causing the computer to:

control an optical element, when a motion of the image capturing apparatus follows a motion of the object, by using (a) first motion information obtained from a first detector to detect the motion of the image capturing apparatus and (b) second motion information obtained from a second detector to detect a motion of an image of the object; and calculate prediction information on a velocity of the image of the object during an exposure time for the image capturing of the object, which includes a change of the velocity from that before the exposure time, by using the second motion information detected at different timings before the exposure time, wherein the prediction information includes a change of a motion from the motion of the image capturing apparatus before the exposure time, and wherein the control program causes he computer to control the optical element during the exposure time, by using the prediction information.

28. A method of controlling an image capturing apparatus configured to perform image capturing of an object, the method comprising:

controlling an optical element, by using (a) first motion information obtained from a first detector to detect a motion of the image capturing apparatus and (b) second motion information obtained from a second detector to detect a motion of an image of the object; and calculating prediction information on the motion of the image of the object during an exposure time for the image capturing of the object, by using the first motion information detected during the exposure time and the second motion information detected at different timings before the exposure time, wherein the method controls the optical element during the exposure time, by using the prediction information, wherein the first motion information includes information about velocity detected during the exposure time, and wherein the second motion information includes information about acceleration which is calculated by using the information about velocity detected at different timings before the exposure time.

29. A non-transitory computer-readable storage medium storing a control program as a computer program to cause a computer of an image capturing apparatus to operate, the image capturing apparatus being configured to perform image capturing of an object, the control program causing the computer to:

control an optical element, by using (a) first motion information obtained from a first detector to detect a motion of the image capturing apparatus and (b) second motion information obtained from a second detector to detect a motion of an image of the object; and calculate prediction information on the motion of the image of the object during an exposure time for the image capturing of the object, by using the first motion information detected during the exposure time and the second motion information detected at different timings before the exposure time, wherein the control program causes the computer to control the optical element during the exposure time, by using the prediction information, wherein the first lotion information includes information about velocity detected during the exposure time, and wherein the second motion information includes information about acceleration which is calculated by using the information about velocity detected at different timings before the exposure time.

30. An image capturing apparatus configured to perform image capturing of an object, the apparatus comprising:

at least one processor or at least one circuit for performing the functions of:

a controller configured to control an optical element, when a motion of the image capturing apparatus follows a motion of the object, by using (a) first motion information obtained from a first detector to detect the motion of the image capturing apparatus and (b) second motion information obtained from a second detector to detect a motion of an image of the object; and a calculator configured to calculate prediction information on a velocity of the image of the object during exposure time for the image capturing of the object, which includes a change of the velocity from that before the exposure time, by using the second motion information detected before the exposure time, wherein the second detector is configured to detect the image of the object to produce the image capturing of the object, wherein the controller is configured to use the prediction information to control the optical element during the exposure time.

31. An image capturing apparatus configured to perform image capturing of an object, the apparatus comprising:

at least one processor or at least one circuit for performing the functions of:

a controller configured to control an optical element, by using (a) first motion information obtained from a first detector to detect a motion of the image capturing apparatus and (b) second motion information obtained from a second detector to detect a motion of an image of the object; and a calculator configured to calculate prediction information on a motion of the image of the object during an exposure time for the image capturing the object, by using the second motion information detected before the exposure time, wherein the second detector detects the image of the object to produce the image capturing of the object, wherein the controller is configured to use the prediction information to control the optical element during the exposure time, wherein the second motion information includes information about velocity, and wherein the prediction information includes information about acceleration which is calculated by using the information about velocity detected at different timings before the exposure time.

32. A method of controlling an image capturing apparatus configured to perform image capturing of an object, the method comprising:

controlling an optical element, when a motion of the image capturing apparatus follows a motion of the object, by using (a) first motion information obtained from a first detector to detect the motion of the image capturing apparatus and (b) second motion information obtained from a second detector to detect a motion of an image of the object; and calculating prediction information on a velocity of the image of the object during an exposure time for the image capturing of the object, which includes a change of the velocity from that before the exposure time, by using the second motion information detected before the exposure time, wherein the second detector is configured to detect the image of the object to produce the image capturing of the object, wherein the method controls the optical element during the exposure time, by using the prediction information.

33. A non-transitory computer-readable storage medium storing a control program as a computer program to cause a computer of an image capturing apparatus to operate, the image capturing apparatus being configured to perform image capturing of an object, the control program causing the computer to:

control an optical element, when a motion of the image capturing apparatus follows a motion of the object, by using (a) first motion information obtained from a first detector to detect the motion of the image capturing apparatus and (b) second motion information obtained from a second detector to detect a motion of an image of the object; and calculate prediction information on a velocity of the image of the object during an exposure time for the image capturing of the object, which includes a change of the velocity from that before the exposure time, by using the second motion information detected before the exposure time, wherein the second detector is configured to detect the image of the object to produce the image capturing of the object, wherein the control program causes the computer to control the optical element during he exposure time, by using the prediction information.

34. A method of controlling an image capturing apparatus configured to perform image capturing of an object, the method comprising:

controlling an optical element, by using (a) first motion information obtained from a first detector to detect a motion of the image capturing apparatus and (b) second motion information obtained from a second detector to detect a motion of an image of the object; and calculating prediction information on the motion of the image of the object during an exposure time for the image capturing of the object, by using the second motion information detected before the exposure time, wherein the second detector detects the image of the object to produce the image capturing of the object, wherein the method controls the optical element during the exposure time, by using the prediction information, wherein the second motion information includes information about velocity, and wherein the prediction information includes information about acceleration which is calculated by using the information about velocity detected at different timings before the exposure time.

35. A non-transitory computer-readable storage medium storing a control program as a computer program to cause a computer of an image capturing apparatus to operate, the image capturing apparatus being configured to perform image capturing of an object, the control program causing the computer to:

control an optical element, by using (a) first motion information obtained from a first detector to detect a motion of the image capturing apparatus and (b) second motion information obtained from second detector to detect a motion of an image of the object; and calculate prediction information on the motion of the image of the object during an exposure time for the image capturing of the object, by using the second motion information detected before the exposure time, wherein the second detector detects the image of the object to produce the image capturing of the object, wherein the control program causes the computer to control the optical element during the exposure time, by using the prediction information, wherein the second motion information includes information about velocity, and wherein the prediction information includes information about acceleration which is calculated by using the information about velocity detected at different timings before the exposure time.

36. The image capturing apparatus according to claim 1 further comprising:

a mode switcher configured to switch a mode between the follow shot mode and the image capturing mode.

37. The image capturing apparatus according to clam 12, wherein the controller corrects blur of the image of the object due to a shake of the image capturing apparatus caused by a camera shake in an image blur correction mode.

* * * * *